United States Patent [19]

Okamoto

[11] Patent Number: 4,686,074

[45] Date of Patent: Aug. 11, 1987

[54] ALTERNATE HIGH-MOLECULE ARRANGEMENT PRODUCTION PROCESS

[75] Inventor: Miyoshi Okamoto, Takatsuki, Japan

[73] Assignee: Toray Industries, Inc., Tokyo, Japan

[21] Appl. No.: 668,879

[22] PCT Filed: Mar. 2, 1984

[86] PCT No.: PCT/JP84/00080

§ 371 Date: Oct. 31, 1984

§ 102(e) Date: Oct. 31, 1984

[87] PCT Pub. No.: WO84/03470

PCT Pub. Date: Sep. 13, 1984

[30] Foreign Application Priority Data

Mar. 3, 1983 [JP] Japan ................................. 58-34906
Mar. 28, 1983 [JP] Japan ................................. 58-50441

[51] Int. Cl.$^4$ ................................................ B29C 47/06
[52] U.S. Cl. ................................... 264/171; 425/198
[58] Field of Search ............... 264/171, 174, 172, 349; 425/198

[56] References Cited

U.S. PATENT DOCUMENTS

| | | | |
|---|---|---|---|
| 3,485,912 | 12/1969 | Schrenk et al. | 264/174 |
| 3,531,368 | 9/1970 | Okamoto et al. | 264/171 |
| 3,540,964 | 11/1970 | Nanta | 264/171 |
| 3,672,802 | 6/1972 | Matsui et al. | 264/171 |
| 3,681,189 | 8/1972 | Matsui et al. | 264/171 |
| 3,700,545 | 10/1972 | Matsui et al. | 264/171 |
| 3,718,534 | 2/1973 | Okamoto et al. | 264/171 |
| 4,284,598 | 8/1981 | Craig, Jr. | 264/171 |
| 4,307,054 | 12/1981 | Chion | 264/171 |
| 4,381,335 | 4/1983 | Okamoto | 264/171 |
| 4,426,344 | 1/1984 | Dinter et al. | 264/171 |

Primary Examiner—James Lowe
Attorney, Agent, or Firm—Austin R. Miller

[57] ABSTRACT

The invention relates to the alternate high-molecular arrangements manufactured through the processes wherein the layers of at least two component high-molecular fluids are formed into layers and so combined with another high-molecular fluid that the former's layers intersect the latter's and the combined flow of the layers is divided into a number of layers, to the processes and to the systems therefor.

In accordance with the invention, the islands in alternate high-molecular arrangements can be increased to a high ratio much easily and economically.

14 Claims, 40 Drawing Figures

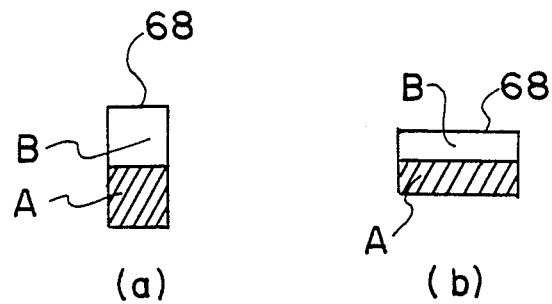
FIG. 13
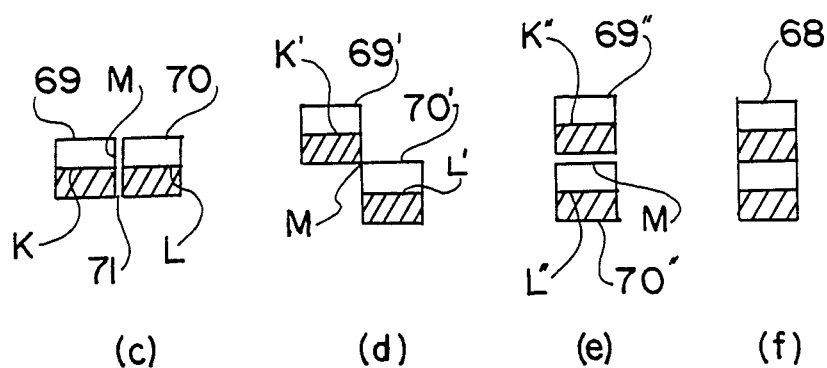
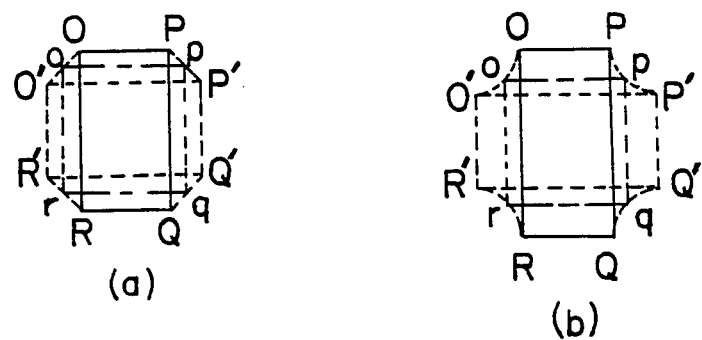
FIG. 14

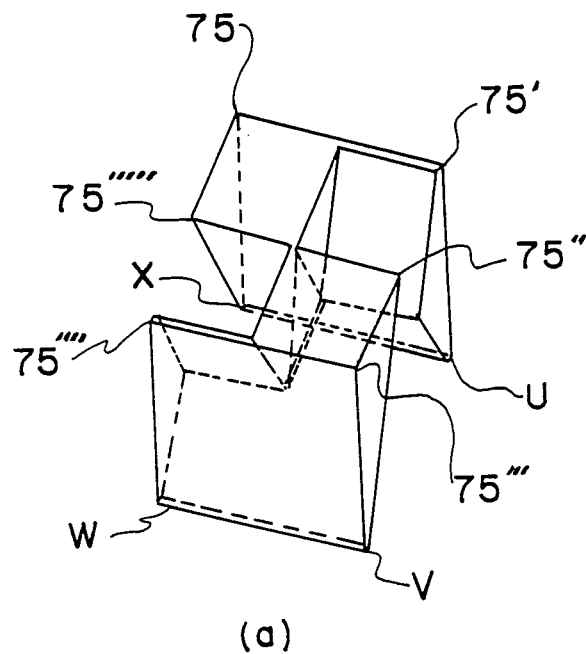
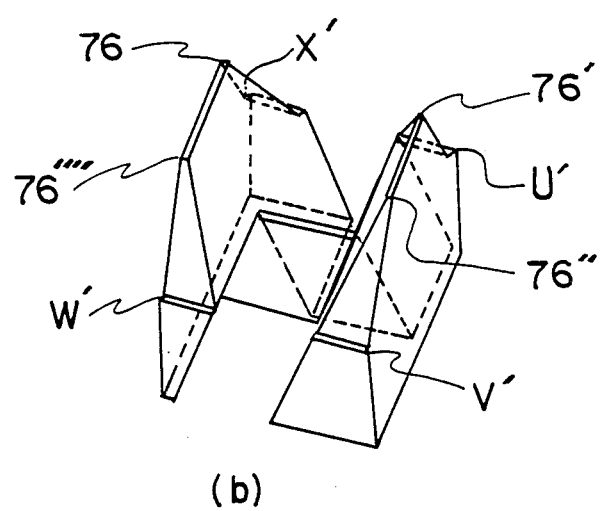
FIG. 17

FIG. 18
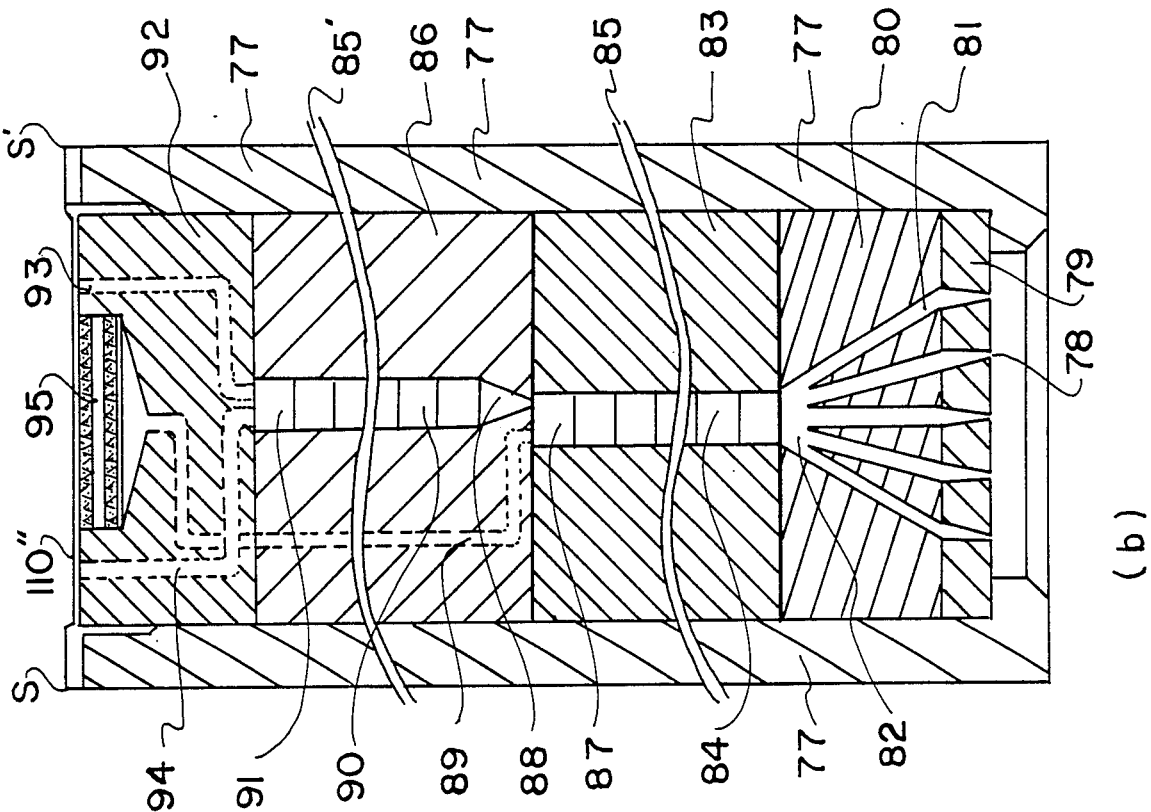
(b)
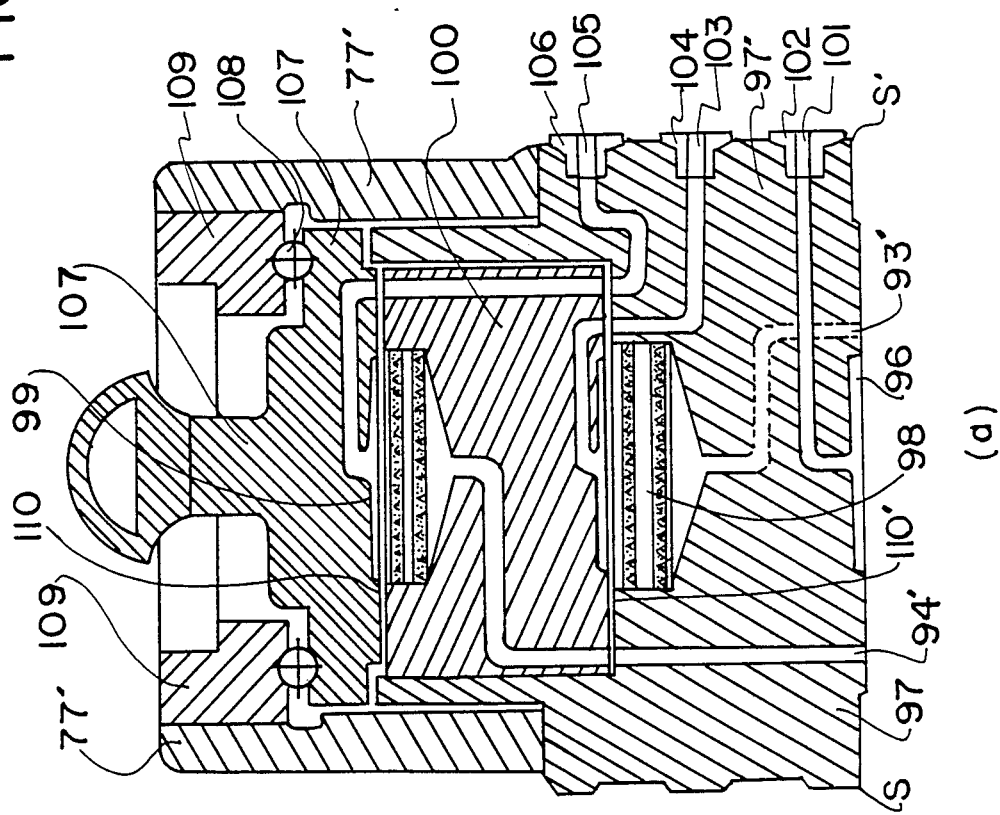
(a)

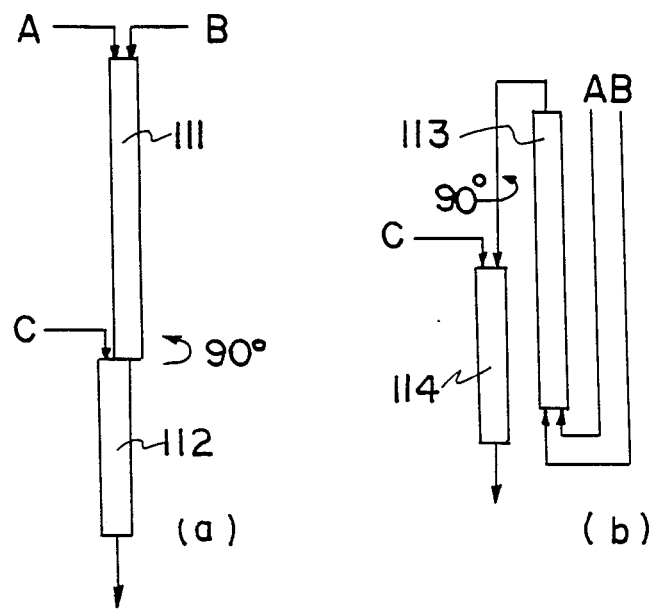
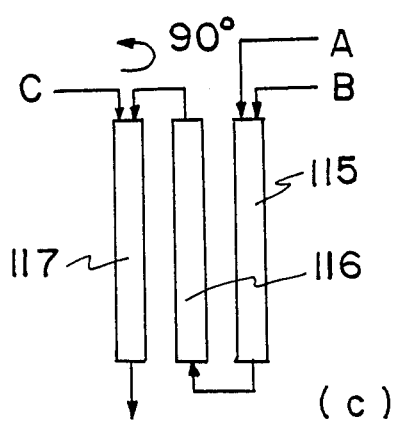
FIG. 20

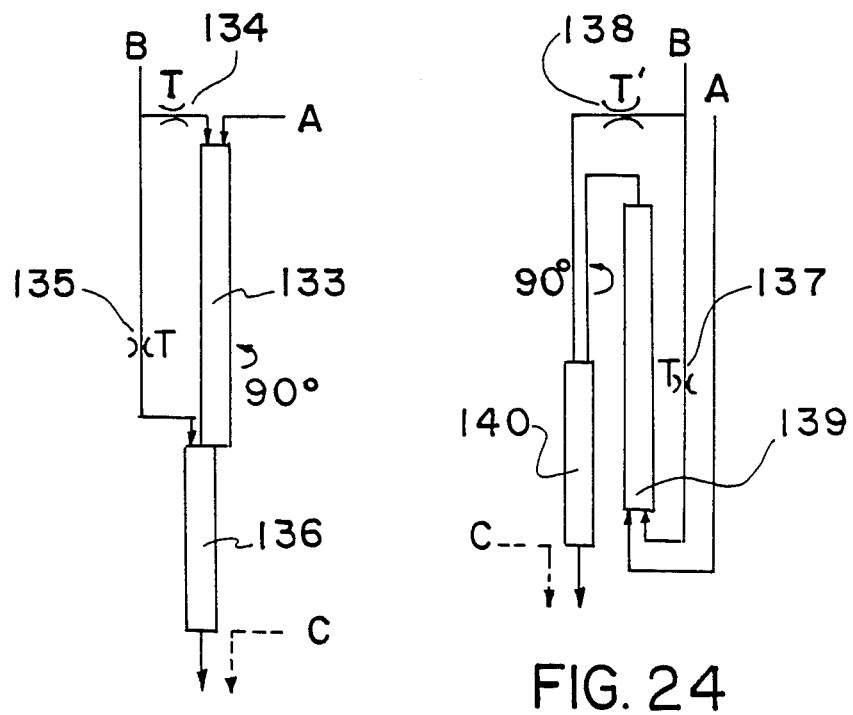
FIG. 23
FIG. 24
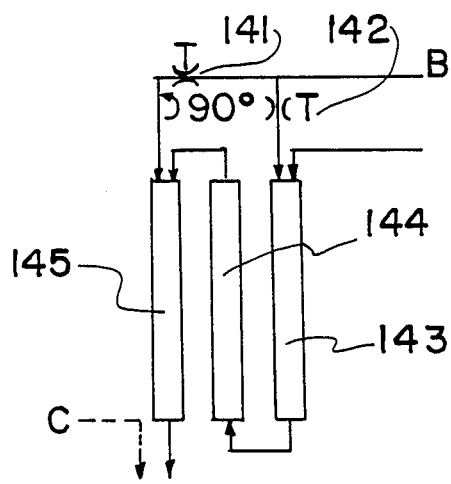
FIG. 25

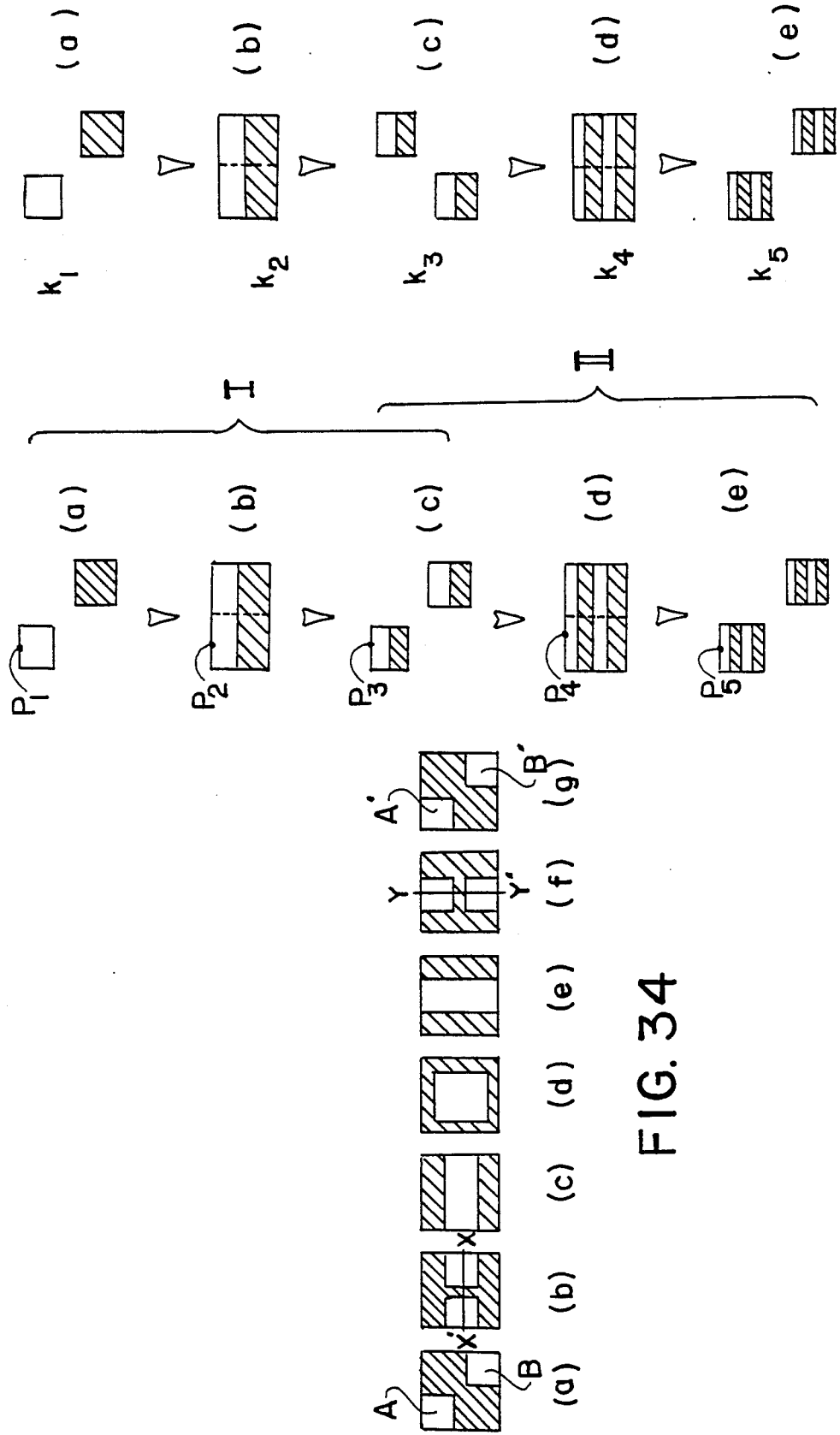

ALTERNATE HIGH-MOLECULE ARRANGEMENT PRODUCTION PROCESS

FIELD OF ART

The present invention relates to the processes and systems for producing the fibers and films (ribbons) in which high molecules are alternately arranged in axial direction.

BACKGROUND ARTS

Alternate high-molecule arrangements are known as "island in a sea" type composite fibers. The ultrathin fibers obtained by dividing them or removing one component therefrom are used for the production of a variety of artificial leathers, waterproof high-density textiles, raised textiles, tricots, filters, high-grade strings, reinforced fibers, and silky textiles and knittings, and for other beneficial purposes. Their films are usable as image guide when put one upon another, polarizing plate, high-grade light reflecting road signs, and applied to optical and other many uses. So far, nevertheless, no process has been presented for easily manufacturing alternate high-molecule arrangement fibers and films.

Conventional processes and systems for obtaining alternate high-molecule arrangement fibers are proposed in Patent Gazette Nos. 18369/1969, 13208/1969 and 26723/1972. The former processes and systems are very useful because of the high ratios of the island components and the accurate arrangement of the islands as well as the highly-steady spinning and much-high controllability thereof, but defective in that their cost is unavoidably raised because the hole of the nozzles cannot be multiplied although the island components are extremely increased in quantity.

On the other hand, Patent Gazette Nos. 3505/1969, 889/1969 and 19604/1968, U.S. Pat. Nos. 3,051,453, and others present the spinning processes wherein the alternate-layer or similar flows of fluids A and B are made (former: ABABABAB . . . ) and passed through a sand layer or metal or cloth gauge for their disturbing and splitting so that the components in large quantity (generally above 50%—this slightly varies in accordance with the differences of viscosity, boundary tension, etc.) surround those in small quantity, both having a dispersion-nondispersion relationship like polymer blend spinnings, by which the spinnings obtained have a fairly-regular arrangement of the components thanks to the spinning holes.

Because the cross-section of the mixed polymer stream varies at every moment, the above-mentioned methods have serious defects: (1) the spinning is not stable, (2) the discharged polymer must be cooled rapidly with a strong flow of cooling air, (3) it is impossible to take up the discharged polymer at high speed, (4) the rapidly cooled fiber possesses inferior physical properties making it impossible to draw and (5) drippings of the discharged polymer sometimes interfere with the spinning process because the randomly mixed polymer has poor fiber forming properties. These are commercially fatal defects because the resulting fiber does not have a high island ratio, the cross-section of every fiber varies, each fiber possesses different physical properties and the spinning process process is not stable.

Several patents, for instance Japanese Patent Publication No. 15530/72, disclose spinning methods and apparatuses in which many paths are incorporated for polymer mixing. However, many disadvantages must be overcome if these methods and apparatuses are used. For example, all polymer components have a laminar structure, each polymer component is distributed nonuniformly throughout the fiber, i.e., the cross section of the fiber is not fixed and varies along the fiber axis, the quality of every fiber varies and the island ratio cannot be controlled.

DISCLOSURE OF INVENTION

An object of the invention is to present the novel alternate high-molecule arrangements suitable for the above purposes and uses, particularly increasing the equivalents to the island components thereof to a large quantity and to a high ratio and thereby enhancing their economic and industrial values. Another object thereof is to obtain the fibers suitable for producing ultrathin fibers by extremely increasing the island components in quantity.

Another object of the invention is to present the "island in a sea" type fibers and films having such amazingly-sophisticated configurations that the islands thereof have "island in a sea" type configurations also.

A further object of the invention is to present the divided type fibers of which one component has alternate high-molecule arrangement configurations. A further object thereof is to present the processes for the highly-steady spinning of the fibers with all of the above configurations.

The invention will be summarized as follows.

(1) An alternate high-molecule production process wherein the primary repeated layer arrangement of at least two high-molecule fluids A and B is made and a secondary great-quantity alternate layer arrangement is made by joining said primary arrangement with another high-molecule fluid C (a component thereof may be the same as any of the components of said primary arrangement flow), which comprises making said secondary alternate arrangement while joining said primary and secondary arrangements so that the layers thereof intersect each other (intersection $\theta$) and the former's alternate layer interface is cut into a number of parts by said layer C and discharging said secondary alternate arrangement through a spinning and film nozzles. Accordingly, this alternate high-molecule production process produces multi-core composite fibers or films.

(2) An alternate high-molecule arrangement discharger which comprises:
   (a) at least three polymer introducing parts and polymer passages connected with said parts,
   (b) a number of connected alternately fluid arranging elements (i) of which a plurality of passage pipes for the alternate great-quantity layer arrangement (primary) of at least two fluids make relative move,
   (c) a substantially $\pm(90\pm45)°$ fluid twisting pipe or an alternately fluid arranging element (d) connected to alternately fluid arranging elements (b) so that flow is introduced while twisted by substantially $\pm(90\pm45)°$,
   (d) the passages connected to the introducing parts for the polymers not constituting said primary arrangement and a number of alternately fluid arranging elements (ii) of which a plurality of passage pipes for the alternate great quantity layer arrangement of the primary arrangement flow and said fluid not constituting said primary arrangement flow make relative move, and (e) a discharge part connected to said elements (ii), having a spinning hole plate of film slits.

(3) An alternate high-molecular arrangement being a composite fiber or film having at least three components, which is characterized in that a number of layers of at least two components A and B are alternately arranged at the section thereof, the layers of component C are present therebetween to separate said layers of both said components, and a number of said layers are arranged axially of said fiber of film.

BRIEF EXPLANATION OF THE DRAWINGS

FIG. 13 is an explanatory view of the basic principle of the alternate fluid arrangement in an alternately fluid arranging element suitable for obtaining an alternate high-molecule arrangement in accordance with the invention.

FIG. 14 is an explanatory view of the principle and structure of a fluid transforming element.

FIG. 17 is the slant views of the two-member alternately fluid arranging elements suitable for obtaining an alternate high-molecular arrangement in accordance with the invention.

FIG. 18 shows a sectional view of a system for discharging an alternate high-molecular arrangement in accordance with the invention.

FIG. 20 is an explanatory views of the various types of flow in accordance with the invention.

FIGS. 23–25 are the explanatory views of the arrangements of the first- and second-fluid alternately-arranging elements and the various fluid distributor systems that can be used for obtaining an alternate high-molecule arrangement in accordance with the invention.

FIG. 34 shows the duct (fluid passage) extending between the inlet and outlet of the alternate fluid arrangement elements shown in FIG. 33.

FIG. 35 is a conceptual diagram illustrating the move of a fluid in a combination of conventional alternate fluid arrangement elements.

FIG. 36 is a conceptual diagram illustrating the move of a fluid in a combination of the alternate fluid arrangement elements in accordance with the invention.

THE BEST FORM TO PRACTICE THE INVENTION

Figure 1:
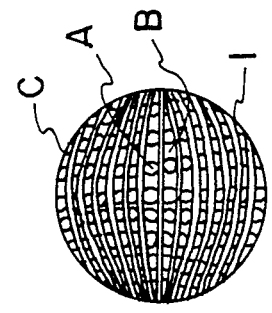
FIG. 1 shows a model section of an alternately high-molecule arranged fiber in accordance with the invention.

FIG. 1 shows an example 1 of a filament having at least three-component composite fibers or films (including ribbons) having axially-arranged multi-layer alternate high-molecule arrangements wherein, at the sections thereof, a number of layers of at least two components A and B are arranged alternately and a third component (including A or B) exists at the interfaces between the components A and B layers. The films (including ribbons) include those extending in some direction.

The interfaces between the A and B layers are generally parallel to each other as described later. As the former are smaller than the latter, however, it becomes small and circular or elliptic due to the viscosity and boundary tension of both layers, and the differences therebetween. The same may occur if A and B are substituted for each other in some cases. However this does not affect the effectiveness of the invention and produces rather favorable effects when ultrathin fibers are produced.

A parallel arrangement of the AB or C layers is theoretically possible but not generally attainable. This is because viscous fluids act like high-molecule solutions in that flow velocity is highest at the center of a pipe but becomes lower closer to the wall. The flow is said to show a parabolic sectional dispersion in circular pipes. When discharged through discharge holes and taken up at a fixed high velocity, high-molecule materials are elongated because their supply is carried out continuously at their center but not sufficiently in the portion close to the wall. The materials therefore maintain a narrow dispersion at the holes close to the wall and show a wide dispersion at the center, i.e. the island component layers (e.g. A) are thick at the center and thin at the edge.

Figure 2:
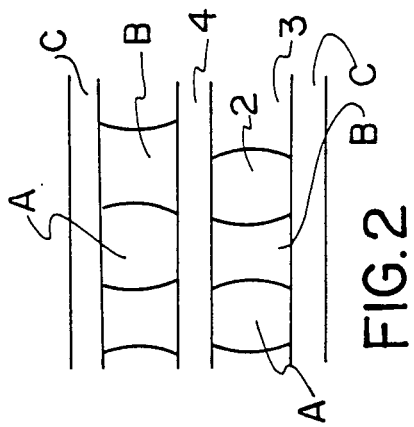
FIG. 2 is an explanatory view obtained by partially enlarging FIG. 1.

FIG. 2 is an enlargement of a part of the filaments of FIG. 1. The following is example of the multi-core composite feature of the fibers: if A, B and C are nonadhesive polymers, polymer C can be separated from the polymers A and B first, then A and B are separated by physical or chemical means after a fiber or film is formed. Their layers and total can be increased to great quantities. Water jet (as thin, strong water flow as needle—e.g. Patent Gazette Nos. 7274/1961, 18069/1972, 13749/1973, 59348/1982, 22230/1969, 58463/1982, etc.) are included among the preferable layer separating means for the articles made by processing such multi-core composite fibers using known means. Ultrathin component A fibers are obtained if B is removed using a solvent or cracker. The ultrathin fibers containing A only are obtained if this removal is made while C and B are combined.

If only the thin thread shaped parts are exposed to the surface of components A or B, then fibers with a high color development performance are obtained, provided they are properly thin.

Figure 3:
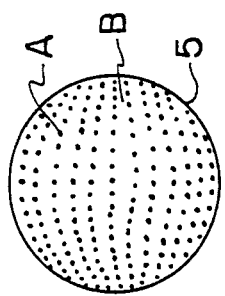
FIG. 3 is a sectional view of an alternately high-molecule arranged fiber in accordance with the invention.

FIG. 3 shows a multi-core composite arrangement, i.e., an "island in a sea" type composite fiber with a large quantity of island component A dispersed along the layer arrangement at one section 5 thereof. Component B is a sea component. The fiber is obtained when component C in FIG. 1 and component B are the same. When component A is more viscous than component B, it has a round appearance. The island components form is suitable for fibers having a large quantity 100–100,000, of island components. Further, the island component ratio can be increased or decreased. In accordance with the invention, the fibers are steadily obtained with a good elongation performance and an excellent island molecule orientation.

Figure 4:
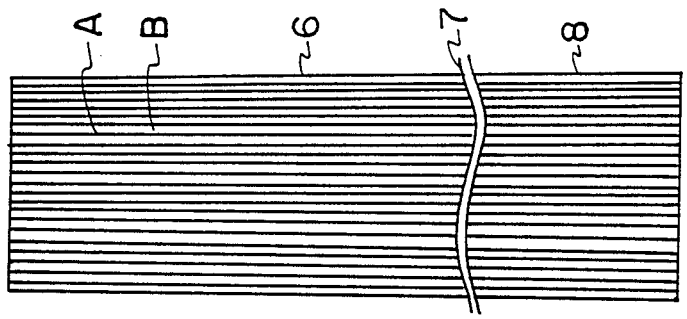
FIG. 4 is an explanatory view of the longitudinal arrangement of an alternately high-molecule arranged fiber in accordance with the invention.

FIG. 4 is a longitudinal section of multi-core composite arrangement in accordance with the invention wherein the components are arranged uniformly along the axis of the fiber or film. Particularly, components A and B in FIG. 3 are arranged substantially parallel along the fiber axis. This can be understood by comparing FIGS. 3 and 4. Component A is represented by lines and numeral 7 is a general symbol indicating its omitted middle part.

Figure 5:
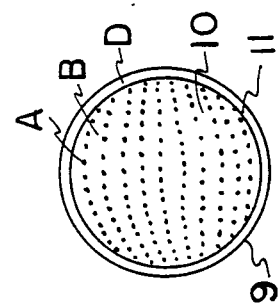
FIG. 5 shows a model section of a core-sheath type composite fiber made by covering an alternate high-molecule arrangement in accordance with the invention with another component.

FIG. 5 shows an alternate high-molecule arrangement in accordance with the invention which is covered with another component 11 (component D) wherein either component A or B 10 is not exposed substantially to the sectional circumference of the fiber. When A is an island component, component D should preferably be the same as component B to prevent the separation of component A from the fiber and to obtain a number of ultrathin fibers at once by removing B.

Of course component D may be the same as component A or different from AB for some purposes. The fibers obtained in this case can be said to be of core-sheath composite type because their core is one of the multi-core composite arrangements in accordance with the invention and their sheath is component D. They are particularly effective for preventing the separation of component A with a small number of splits from component B.

Figure 6:
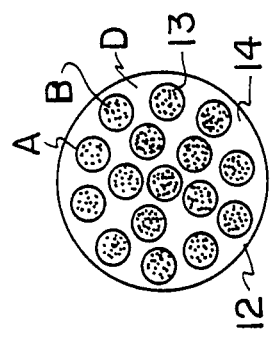
FIG. 6 shows a model section of a "island in a sea" type composite fiber whose island component is an alternate high molecule arrangement.

FIG. 6 shows an "island in a sea" type composite fiber whose island and sea components are AB 13 and D 14 respectively. The former is of the sophisticated fiber forming an alternate high-molecule AB arragement. So the fiber 12 can be said to be of a "island in a sea" type composite fiber. Particularly island component A is suitable for otaining ultrathin fiber bundles since it is dispersed to a considerable extent. Island components A are illustrated as large circles although they are too small and too numerous to illustrate. Of course the components are arranged along the fiber axis.

Figure 7B:
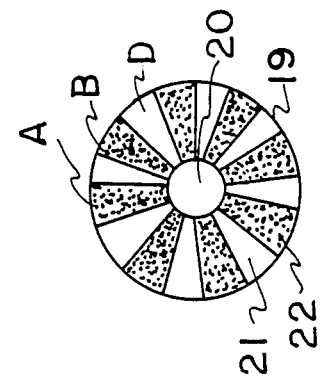
FIGS. 7 and 8 show the model sections of a composite fiber of which one component of the peel or division type composite fiber is an alternate high-molecule arrangement in accordance with the invention.
Figure 7A:
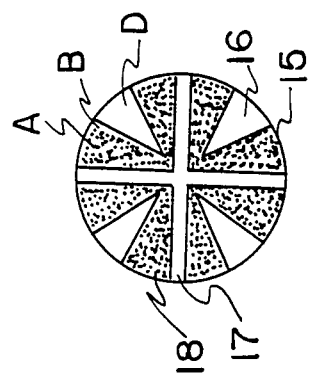

FIG. 7(a) shows a divided type alternate high-molecule composite fiber. At section 15, no dividing component AB 18 is absent, an alternate high-molecule arrangement with a sectional distribution as shown in FIG. 3, is divided by dividing components 16 and 17.

FIG. 7(b) shows a divided type hollow composite fiber 19. Its alternate high-molecule arrangement 22 A and B are divided into a number of parts by the component D 21 existing therebetween. Its central part 20 is hollow. Dividing component D may be the same as A or B.

Figure 8:
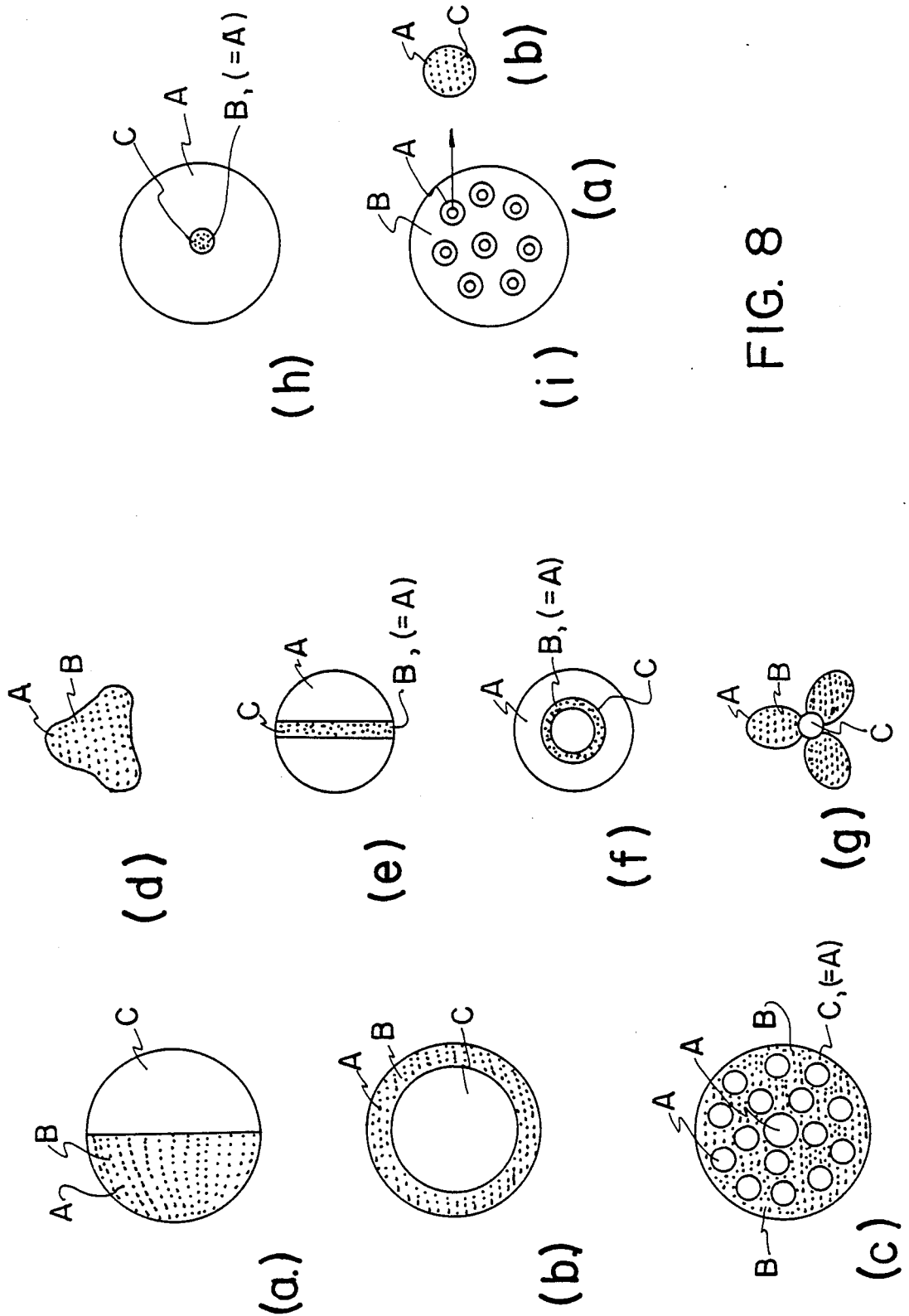

The processes and systems for producing the fibers are obtainable by introducing the flow of alternate high-molecule arrangement among the components of the nozzles referred to in Patent Gazette Nos. 54707/1974, 7368/1974, 73103/1975, 60769/1975, 14608/1975, 4320/1975 and 13620/1975 for their type in FIG. 7, and Patent Laid-Open Nos. 70366/1976, 130317/1975 and 40424/1975 for their type in FIG. 8. The same easy procedure can be used to make these fibers as well as the fibers in FIGS. 1, 5 and 6. The processes and systems to obtain the sophisticated fibers illustrated FIGS. 8(a) to 8(i) are referred to above.

Figure 9:
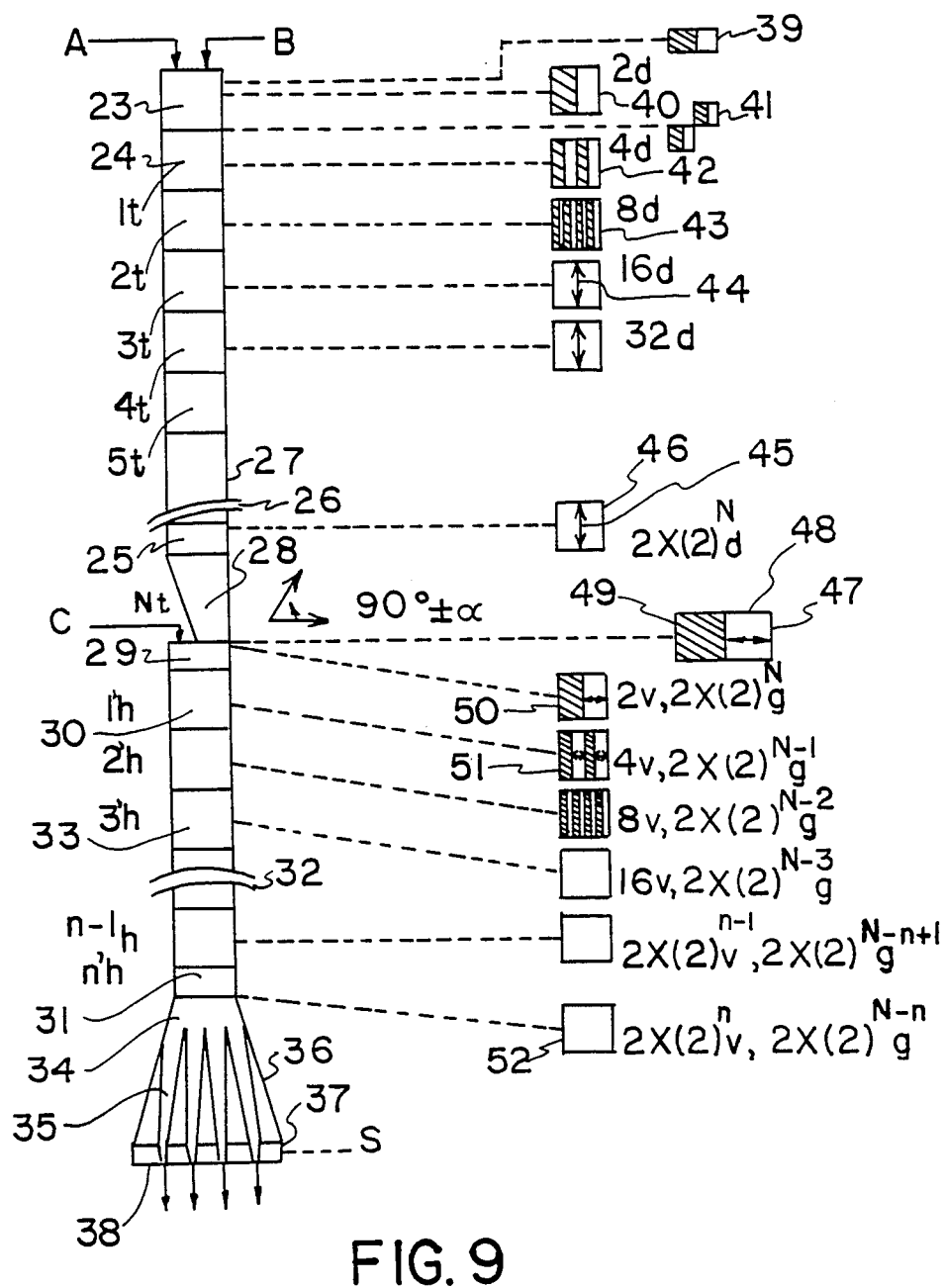
FIG. 9 is an explanatory view of the basic principle of obtaining an alternate high-molecule arrangement in accordance with the invention.

FIG. 9 illustrates the basic principle why superior alternate high-molecule arrangements are easy to obtain using the systems and processes in accordance with the invention. A and B are introduced into fluid introducing part 23 by pumps respectively. As will be stated later, the fluid introducing part can be said to be made of a part of an alternately fluid arranging element. Provided thereunder are other alternate fluid arranging elements. Numeral 24 indicates the first stage thereof ($1t$). The second stage ($2t \ldots Nt$) is put thereunder. The N-th stage 25 is $Nt$. They are called first-fluid alternately-arranging elements.

At that time fluid AB is subjected to most simple lamination 39 at the inlet and transformed into 40 ($2d$). Next fluid AB has such a high molecule arrangement 41 to fit to alternately fluid arranging element 24, then 42 at the central part of the elements and is divided into four layers ($4d$) for the first time. Similarly $8d$ is obtained at $2t \ldots 2 \times 2^N d$ at $Nt$. Alternately fluid arranging elements have a function for alternately arranging fluid layers one by one. They are kind of so-called static type fluid mixers but required to be capable of alternate fluid arrangement as well as mixing. Alternately fluid arranging elements are the basic units for alternately arranging fluids. It is put in multiple stages. The examples of alternately fluid arranging elements will be described later.

FIG. 9 shows the direction of the interface between A and B that is indicated by upwardly- and downwardly-pointing arrows 44 and 45, detailed drawings at 3t, 4t and Nt are omitted. Layers 42 and 43 illustrate the point. Numerals 26 and 32 are abbreviated symbols to indicate that a number of such elements are used.

The $2 \times 2^N$ layers (A: ½) of primary arrangement flow are arranged alternately with component C layers and this alternate arrangement is introduced into the second-fluid alternately-arranging elements. The relationship between the directions of the interfaces between component C layers and the interfaces formed between AB flow layers at the upper course are very significant. It is preferable that the angle $\theta$ therebetween is about 90°. Figure shows these interfaces twisted by $90° \pm \alpha$ ($0 < \alpha < 90°$). Either their upper- or lower-course parts may be twisted or a fluid twisting element may be set as will be stated later.

Next, fluid AB is introduced into the introducing part 29 of the next alternately fluid arranging element so that it is after as smoothly passing through a square funnel lamination with component C is possible as is indicated by numbers 48 and 49. The direction of the interfaces AB that is twisted by $90° \pm \alpha$ is indicated by the right- and left-hand arrows 47 (in the drawing, twisting is made by amount 90°). Fluids AB and C are transformed into alternately arranged layer 50 when further falling into 29. Layer 50 has two alternately-arranged layers that are represented by 2v. At this time it has $2 \times 2^N$ alternately-arranged layers. In the drawings the layers represented by $2 \times 2^N q$. Connected thereto are a number of alternately fluid arranging elements 30 (1'h) ... 31(n'h). They are clalled second-fluid alternately-arranging elements.

Thus in the case of 2'h, the four (4v) layers AB between layers C decrease to $2 \times 2^{(N-1)}$, i.e. $2 \times 2^{(N-1)}q$ because of their elongation. This is important for understanding the invention. It will be described in further details in connection of the illustration of a system. At n'h, the $2 \times 2^n$ ($2 \times 2^n v$) layers AB between layers C decrease to $2 \times 2^{(N-n)}$, i.e. $2 \times 2^{(N-n)}q$, because of their elongation. Numeral 52 indicates a section of fluid ABC (FIG. 2), however the layers are not illustrated because they are too small. When it is discharged through one nozzle, a fiber or film with such a section is obtained. If many nozzle holes are used, the same quantity of nozzles as nozzle holes should be constructed. If distribution is made smoothly using a multi-leg funnel 36 as shown in FIG. 9, however, the number of distributions decreases by the amount corresponding to the number of layers. Nevertheless the discharge of alternate high-molecule arrangements remains possible. Numeral 37 denotes nozzle S with a discharge holes 38. It is important to give a suitable shape to a funnel 35 to permit smooth introduction of the fluids into nozzle holes 38 from the lower part 36 of an alternately-fluid arranging element. If component D is introduced together with component C, they both form thin laminated layers. It would be clear that flow CD is so arranged as to cut flow AB. On the other hand, it is also clear from the description made heretofore that laminated layer flow ABE may be formed by adding component E to flow AB. Heretofore the, discussion has concerned the first arrangement flow comprising two components A and B. Of course, the first arrangement flow is applicable also to a flow comprising more than three components. For simplicity description will be continued as to the two component arrangement.

Discussion will be made as to the key points of the invention in further details in connection with FIG. 10. Numeral 55 in FIG. 10(a) denotes layer flow AB. It is obtained by introducing flow AB into a number of alternately fluid arranging elements arranged in series. The drawing shows this flow joining with component C which has been introduced almost orthogonally. The change of the flow ABC passing the first stage of alternately fluid arranging elements is shown in FIG. 10(b). In FIG. 10(a), numerals 56, 53 and 54 indicate component C, the interface between layers AB and C, and that between layer A and B, respectively. It should be noted that 53 and 54 intersect each other substantially orthogonally. This example shows eight layers A and eight layers B. The layers in FIG. 10(a) are compressed laterally so that they increase two times in longitudinal size and layers AB increase in thickness and can be divided in two laterally at their middle as shown in FIG. 10(b). If the joining of A, B and C is so made that all the interfaces therebetween become parallel, a known multi-layer structure not aimed at by the invention AB-CABCABCABC ... is obtained. Layers AB are thus inserted between layers C to separate them. Numerals 57 and 58 indicate the interfaces between layers C and AB, and 59 and 60 indicate the interfaces between layers AB. The following should be noted: there still remains a substantial orthogonal intersection between 57 and 58 and between 59 and 60. FIG. 10(b) shows layers AB have been longitudinally cut in half and they have become small in size. Thus to obtain layers A and B with a nearly-square sectional shape (round due to boundary tension) it is necessary to have twice as many divisions of A and B as there are layers of C. To obtain well-dispersed A or B, therefore, preferably 1.5, more preferably 1.8, −3 times as many divisions of A and B are needed after joining with component C.

Figure 11:
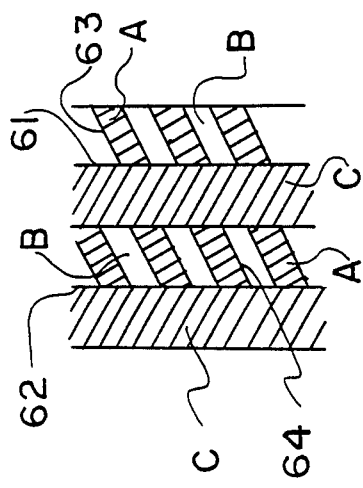
FIGS. 11 and 12 are the explanatory views of the alternate fluid arrangement for obtaining an alternate high-molecule arrangement in accordance with the invention.
Figure 10:
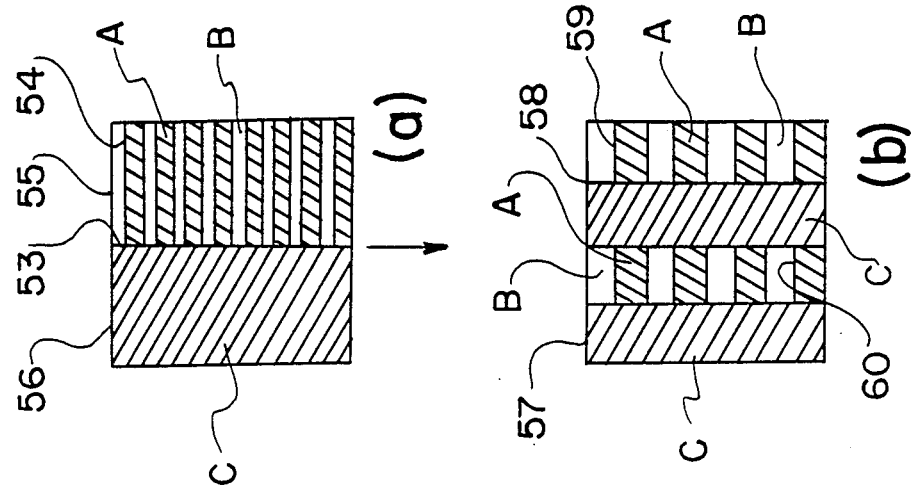
FIG. 10 is an explanatory view of the basic principle of the fluid distribution for obtaining an alternate high-molecule arrangement in accordance with the invention.

FIG. 11 shows the substantially same relationship between the components as in FIG. 10, indicating that AB interface layers 63 and 64 are slanted with respect to component C interface layers 61 and 62 (angle $\theta$). In brief, interface layers AB are cut into a number of parts by layer C. Preferably is $< \alpha < 45$, more preferably $0 < \alpha < 15$, when $\theta = \pm (90 \pm \alpha) \pm$ (integer) $\times 180°$.

Figure 12:
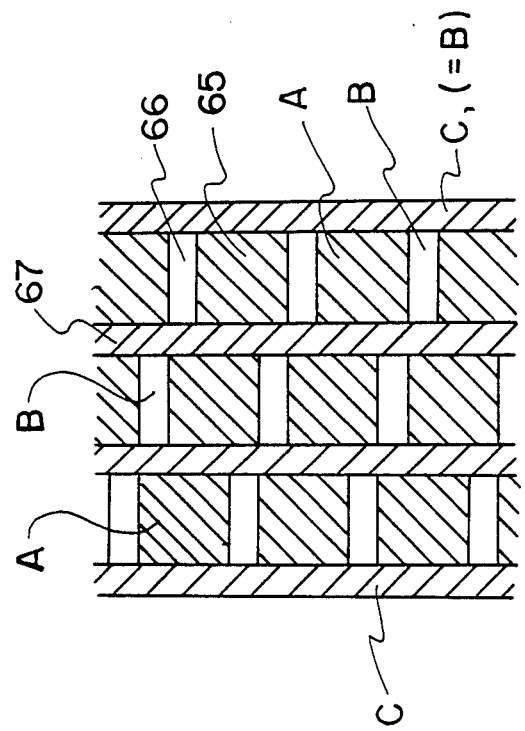

Component layers A and B are formed thick and thin respectively if they are introduced in concomitantly small and large when layer Ab flow is formed. If a small quantity of component C is additionally introduced to alternate arrangement, an alternate high-molecule arrangement with a high ratio of component A islands is obtained as shown in FIG. 12. It has a considerably enhanced value when component A is left with component BC removed. It is therefore preferable in this respect that B=C in connection with FIGS. 10, 11 and 12 in many cases. If layers BC can be formed without causing any disturbance, then component A can be increased to a considerably-high ratio.

Next, description will be made in more detail as to the alternate fluid arrangements that produce favorable effects for the invention and why such effects and configurations as shown in FIG. 10 are obtained.

Patent Laid-open No. 145522/1980 (fluid Mixer) discloses an alternately fluid arranging element that produces a suitable effect for the invention. The description therein will be quoted and supplementary explanation will be made for illustrating the configurations of the invention which follow:

"An alternately fluid arranging element having at least one unit interconnecting a transformed element with one passage and a movable part with two passages in a duct, the former having a continuously varying shape substantially without varying the area of the sectional plane orthogonally intersecting one passage duct whose sectional shape is kept parallelogramic and the latter having two passages whose parts adjacent to the former have the same shape and of which the sum of the areas of the sectional planes orthogonally intersecting the duct is substantially equal to the sectional area of the former's adjacent part, the middle part of said passages bending so that their central lines become symmetric with each other or with respect to one point without causing mutual interference, said passages overlapping each other at their both ends (division-overlap-increase in sectional size type alternate fluid arranging elements)". Namely the following procedure is used for supplying fluids.

"In making the alternate layer arrangement of two high-molecule fluids A and B by causing interfaces therebetween without causing any large turns thereto, a process (division-overlap-increase in sectional shape type systems) consisting of dividing said fluids into a plurality of small parts, making the overlap rejoining of said parts, increasing the interfaces AB in size by compressing said rejoining, and dividing said rejoining into a plurality of small parts for forming a layer flow". Particularly preferable for the invention is "In said process, a method for introducing said fluids so that the total sectional area of a plurality of small divisions thereof is substantially equal to that of the overlap rejoining thereof."

FIG. 13 is an explanatory drawing of the fluid arrangement mechanism of an alternately fluid arranging element preferable for the invention.

As shown in FIG. 13(a), fluids A and B are supplied to one longitudinally-rectangular passage 68. Passage 68 is transformed laterally into rectangular as shown in FIG. 13(b) but the sectional area of passage 68 in FIG. 13(b) is substantially kept constant. In the process of the change from the state in FIG. 13(a) to that in FIG. 13(b), passage 68 continuously varies in sectional shape but does not substantially vary in sectional area. The part continuously varying the sectional shape while keeping the sectional area substantially constant of is called the shape varying part of passage 68.

Next, passage 68 is divided into two passages 69 and 70 having the same sectional area with the same shape separated by a wall 71. FIG. 13(c) shows the relationship among M (the center of the duct), K and L (the centers of divided passages 69 and 70). Next, passage 69 is transformed into passage 69' by transferring its center K upward to K' while maintaining its sectional shape and area. On the other hand, FIG. 13(d) shows passage 70 forming passage 70' by transferring its center L upward to L' while maintaining its sectional shape and area. In the process of the change from the state in FIG. 13(c) to that in FIG. 13(d), the centers of passages 69' and 70' constantly remain symmetric with each other with respect to the center M of the duct. Both passages constantly remain equal in length and in distance from the center of the duct. Further passage 69' forms passage 69" by transferring its center rightward to K", and passage 70' by transferring its center L' leftward L" while maintaining the point-symmetric relation. Passages 69' and 70' take such a form that the parts of passage 68 are put one upon another in parallel to the lines of the cutting by wall 71. This is shown in FIG. 13(e). FIG. 13(f) shows that the fluids coming out of passages 69' and 70' overlap each other and reach next passage 68. The part thus working is called the transfer part.

FIG. 14 illustrates the transformation process from the state in FIG. 13(a) to that in FIG. 13(b).

FIG. 14(a) shows a mode of the sectional variation from the state of the passages (solid lines) to that of passages (dotted lines). Therein the solid lines indicate a rectangular section OPQR of a passage and the dotted lines represent another rectangular section of O'P'Q'R' thereof. If a section obtained while points O, P, Q, R move straight to O', P' Q' and R', respectively, corresponding thereto is rectangular inscribing the lines and have the edges op, pq, gr and ro parallel to OP, PQ, QR and RO respectively, have maximum sectional area, 1.125 times of that obtained when it is rectangular OPQR, when it becomes quadrate opqr. The system in accordance with the invention is easy to manufacture because the variation of sectional area is considerably smaller about ⅛ that of the mixers (alternate fluid arranging elements) mentioned in Patent Gazette 437/1964. Accordingly, the variation in sectional area can be regarded as substantially zero. For obtaining higher-precision systems, straight lines OO', PP', QQ' and RR' should be changed to internally-convex rectangular hyperbolas as shown in FIG. 14(b). The passage thus obtained does not vary in sectional area at all.

Further the sectional area is varied to a minimum or maximum value be selecting desirable curves for interconnecting OO', PP', QQ' and RR'.

The sectional shape of the inlet and outlet (FIG. 13(a) and (b)) of passage 68 or passages 69, 69', 69" and 70, 70' and 70" of an alternately fluid arranging element suitable for the invention should most preferably be rectangular or quadrate, respectively. The systems can thus be made minimum in sectional area. The invention is not however limited thereby.

Figure 15:
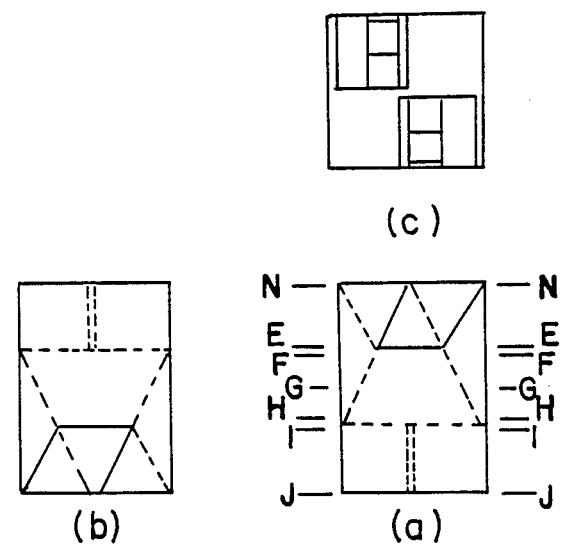
FIG. 15 is a sectional view of an alternately fluid arranging element suitable for obtaining an alternate high-molecule arrangement in accordance with the invention.

FIG. 15 shows an alternately high-molecule arranging element unit suitable for obtaining alternate high-molecule arrangements in accordance with the invention. FIGS. 15(a), 15(b) and 15(c) are its front view, side view and plan respectively. In actual use a plurality of these units are connected in series. In many cases, however, their specified cut parts are connected to their lower and upper parts for the convenience of the introduction and discharge of fluids (they are applicable to the introduction and discharge parts for fluids A and B and those for fluids C and AB in FIG. 9).

FIG. 16(a)–FIG. 16(g) show the sections N-N, E-E, F-F, G-G, H-H, I-I and J-J in FIG. 15.

The two fluids may be introduced into any of the section N-N, E-E, F-F, G-G, H-H, I-I and J-J. A proper one is however selectable by seeing FIGS. 16(a) and (q).

The following should be noted: the right- and left-hand arrows indicate that the two fluids are flattened while elongated together with their interfaces in the same direction as the interfaces in the sequence shown in (a), (b) and (c). The two marks at the tip of the arrows indicate the increase of the distance therebetween. They serve for understanding the alternate arrangement underway between fluids AB and C as shown in FIG. 10.

FIG. 17 is a slant view of a divided 2-member structure of an alternate fluid arranging element unit. The alternate fluid arranging unit therein can be formed by bringing U, V, W and X of member (a) and u', v', w' and x' of member (b) into contact.

FIG. 17(a) shows uppermost-located 75, 75', 75", ... 75"", and FIG. 17(b) upwardly-protruding 76, 76' ... 76"".

If members (a) and (b) are arranged in a square tube with a quadrate hole through the sections, the alternately fluid arranging unit is easy to assemble and overhaul.

Alternate fluid arranging elements are a kind of so-called static type mixers. "Mix" is different from "arrange" in meaning. So the designation is distinguished in the present description. It is known that mixers can be divided into two: (1) for transit of the relative position in a plurality of passage pipes and (2) for the transit of the relative position due to the sectional flow-velocity distribution in the passage pipe. The former is considerably more suitable for the invention. The alternately fluid arranging elements mentioned in the Netherlands Patent No. 185539, U.S. Pat. No. 3,206,170, U.S. Pat. No. 3,583,678 and Patent Gazette No. 437/1964 are inferior to that mentioned above but most suitable next thereto for the principle of the invention.

Patent Gazette No. 437/1974 discloses "In making the layer arrangements of two high-molecular fluids without causing any large turns to the layer flow thereof, a process consisting of dividing said fluids into a plurality of small parts, increasing said parts in size in a plane not common to that of a divider and subjecting said parts to overlap rejoining (division—increase in sectional size—overlap systems)" and "A system element for dividing and rejoining flows in a cooperative combination of the conduits with upper and lower-course ends; said partition and conduits partitioning a plurality of connecting passages interconnecting the ports of said upper- and lower-course ends; said passages having a flow divider adjacently to said upper-course end, limiters between the inlet and outlet and between said inlet and outlet, a generally-slender section perpendicular with the flow in said conduits at either of said inlets and outlets at least; said sections of said inlets having no common main plane with the opposite end to said passages (division—increase in sectional size—overlap alternate arranging elements)". It is inferior to the above elements because fluids tend to be disturbed in the passages increasing and decreasing in sectional size but is applicable to the invention.

Patent Laid-Open No. 94945/1973 discloses "An alternately fluid arranging element in a structure with a number of built-in divided flow varying units longitudinally connected in series throughout a hollow square pipe, said units consisting of an upper and lower liquid division plates and a guide plate on which the divided liquids flow alternately changing their direction by 45° with the longitudinal direction." It is also applicable to the invention. Besides those applicable to the invention include Square Mixer manufactured by Sakura Seisakusho and SMV Type Static Mixer manufactured by Sulzer, Switzerland, which require it to be noted that fluids are subject to slant alternate arrangement.

FIG. 18 shows a discharger for the alternate high-molecule arrangements in accordance with the invention. FIGS. 18(a) and (b) dividedly showing it should be combined by bringing S and S' in the both into contact to totally illustrate it.

Numeral 77 denotes a mantle, 77' a part with a cut thereof, 78 a discharge hole in a nozzle, 79 a nozzle, 80 an insert block with a fluid distribution hole 81, 82 an alternately high-molecule arrangement forming space, 83 a second-fluid alternately-arranging element insert block, 84 an alternately fluid arranging element, 85 and 85' omission symbols, 86 a first-fluid alternately-arranging element insert block, 87 an alternately fluid arranging element, 88 a funnel for introducing AB alternately-arranged flows into the second-fluid alternately-arranging elements, 89 a component C introducing hole in 86, 90 an alternately fluid arranging element, 91 an alternately fluid arranging element, 92 an insert block including fluid ABC introducing passages and a component B filter 95, 93 a component B introducing passage, 94 a component A introducing passage, 96 a component C introducing passage, 97 an insert block including the inlet for introducing component ABC from outside and having a component A filter 98, 100 an insert block including component B filter 99, 101 a component C introducing part, 102 a packing, 103 a component A introducing part, 104 a packing, 105 a component B introducing part, 106 a packing, 107 a cover serving as component B passage also, 108 a ball bearing for facilitating the turn of a clamp screw 109, and 110 a packing between the insert blocks.

The packings are connectable by pressing them against the 3-component supply holes in the spinning head. No illustration would be necessary for alternately fluid arranging elements because they are described in details above.

Figure 19:
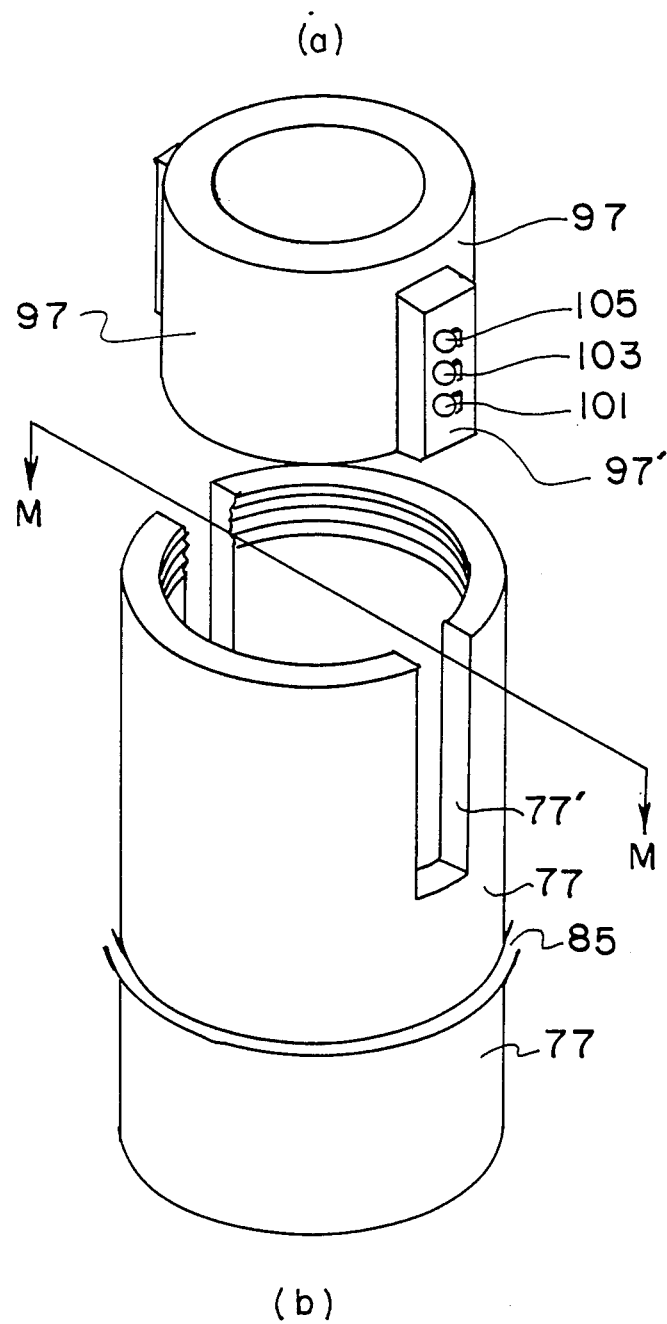
FIG. 19 is an explanatory view of the relationship between the pack mantle and insert blocks for fitting an alternately-fluid arranging element suitable for obtaining an alternate high-molecule arrangement in accordance with the invention.

FIG. 19 is a slant view for ease of understanding how insert block 97 is packed in the pack mantle.

Numeral 97 has a projection 97' and high-molecule introducing holes 101, 103 and 105. This would be easy to understand if FIG. 18 is supposed to show the section M-M' of the pack mantle.

Alternately fluid arranging elements are generally desired to be circular because holes are easy to make therein using a lathe or a drill. A method of providing square holes in the insert blocks in accordance with the invention is such that cutting is carried out after making small holes. Another ingenious method for the same consists of dividing the insert blocks in two, making square grooves, combining them thereby, fastening them using screws, cutting their surface to adjust them to the inner size of the pack mantle, and annealing them; or making them; and screwing them.

Next, discussion will be proceeded to the modes of the arrangement of the first- and second-fluid alternately arrangement elements.

FIG. 20(a) shows the connection of the second-fluid alternately-arranging elements arranged with the first-fluid alternately-arranging elements in series.

FIG. 20(b) shows an upwardly-directed arrangement of the first-fluid alternately-arranging elements 113 for introducing fluids together with component C into the second-fluid alternately-arranging elements 114 without causing any disturbance, in case the arrangement in FIG. 20(a) is not convenient because it is excessively large in longitudinal size.

FIG. 20(c) shows the first-fluid alternately-arranging elements divided in two—longitudinal arrangement 115 and upwardly-directed arrangement 116—for introducing fluids together with component C into the second-fluid alternately-arranging elements without causing any disturbance in case the arrangement in FIG. 20(b) is not convenient because it is excessively-large in longitudinal size. Needless to say an angle of 90° for example is necessary between 111 and 112, between 113 and 114 and between 116 and 117.

Figure 21:
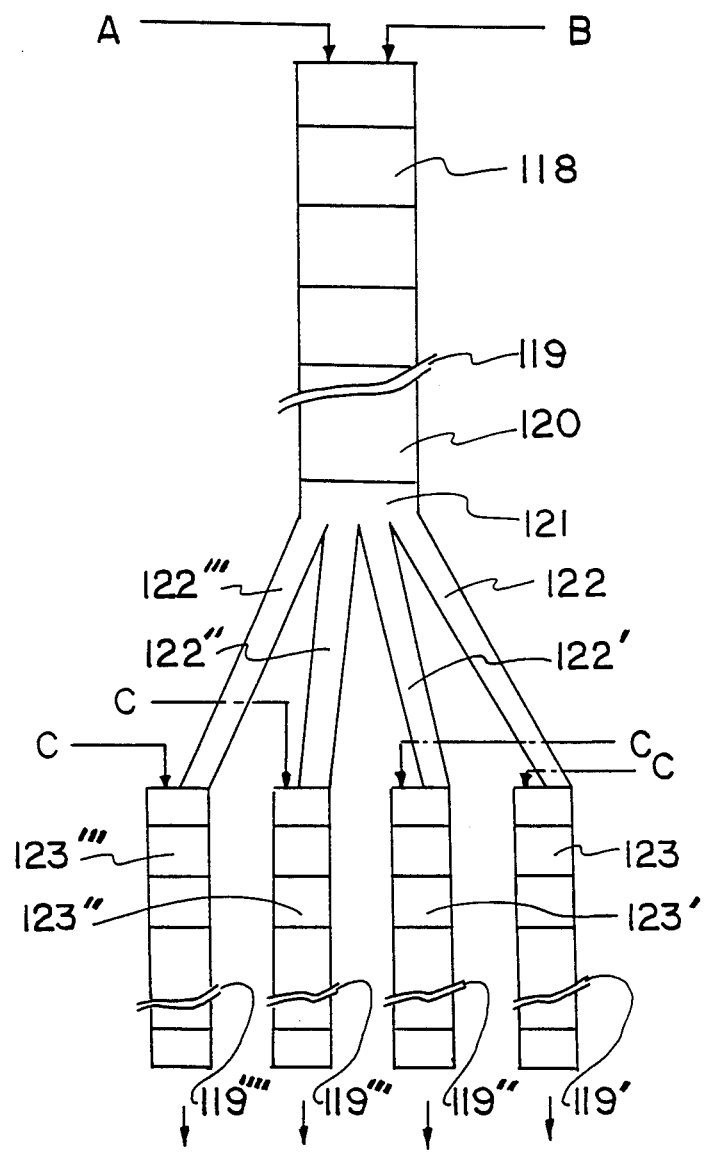
FIG. 21 is an explanatory view of the other modes of arranging the first- and second-fluid alternately-arranging elements usable for obtaining an alternate high-molecule arrangement in accordance with the invention.

FIG. 21 shows such a desirable mode of arrangement that a plurality of groups of second-fluid alternately-arranging elements 123 are provided for a group of first-fluid alternately-arranging elements 118 to 120. Numeral 119 is an omission symbol.

Alternate fluid AB arrangement passes through branch conduits 122 from 121 and is introduced into the second-fluid alternately-arranging elements 123 together with component C while twisted by 90°. It should be noted that fluid AB is axially divided in more parts by the branch conduits 122.

Figure 22:
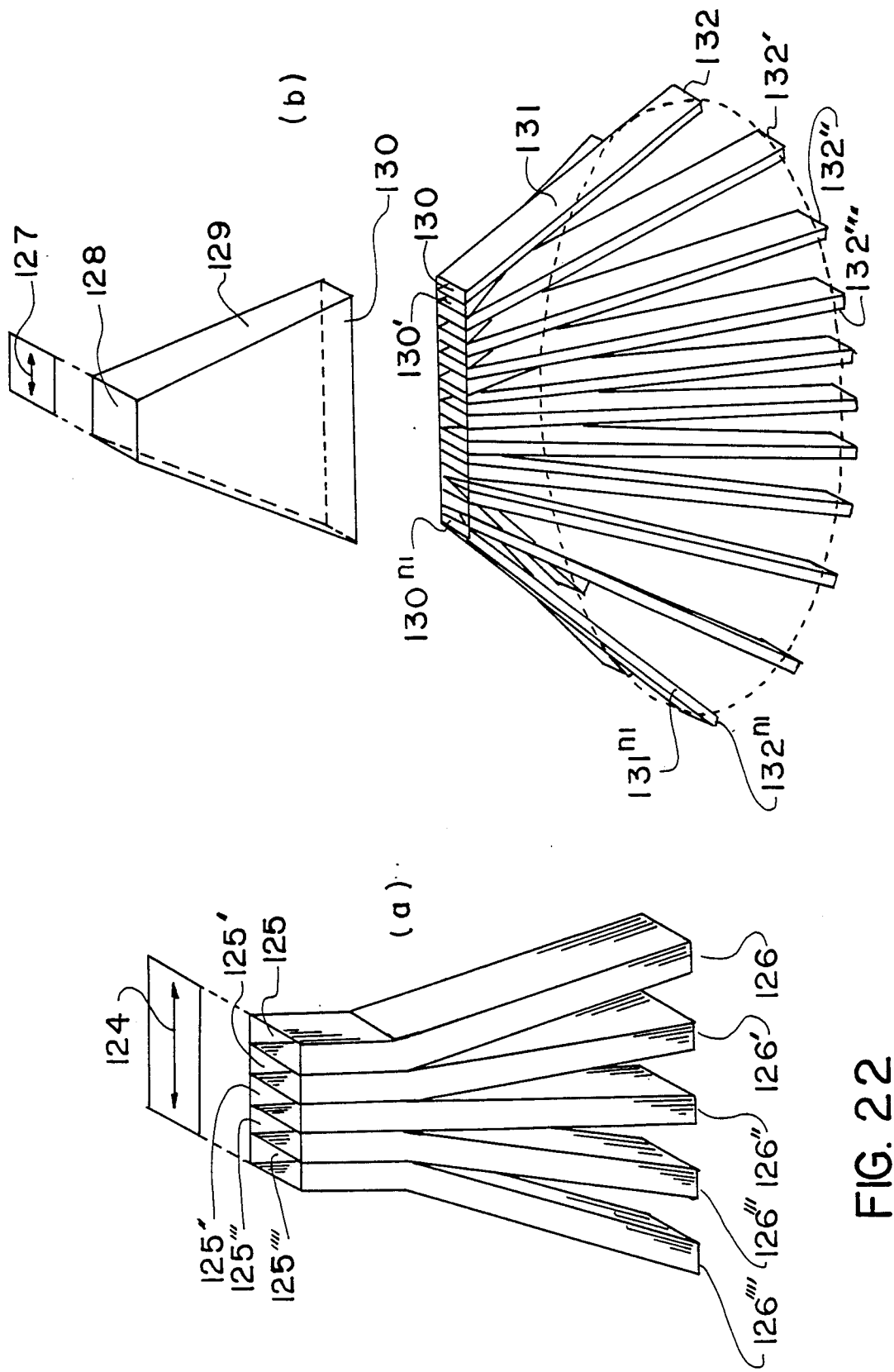
FIG. 22 is an explanatory view of the types of the distributors that can be provided between the first- and second-fluid alternately-arranging elements usable for obtaining an alternate high-molecule arrangement in accordance with the invention.

FIG. 22(a) shows a configuration and a mode of the branches of the fluid. The direction of fluid AB layers is indicated by arrow 124. Several divisions (five in the drawing) are provided orthogonally with the arrow. It should be noted that they are not parallel to the arrow.

Numeral 125 is connectable similarly to 121 connected to 120 in FIG. 21. Alternate AB arrangement 126 can form the next alternate arrangement with fluid C after divided into 126.

On the other hand FIG. 22(b) shows a duct with a passage for axially elongating fluid AB layers for further resisting efficiency when they are introduced in both arrow directions 127 and 128.

Fluid 130 obtained by increasing fluid 128 in sectional area is divided into (n) parts (20 in the drawing) 130, 131', ... 130n' when passed through conduits 131, ... 131n' and the divisions are subjected to alternate distribution with fluid C. (In the drawing distribution is made to 132, 132', ... 132n' and alternate circular pipings are made.)

Distribution efficiency can thus be considerably raised. In accordance with the invention, however, this is possible by increasing alternately arranging elements by the space corresponding to 128, 129 and 130 in many cases.

The keys to achieving the purposes of the invention include not to make any dead space in fluid flow, not to repeat the sudden increase and decrease in sectional size of fluid, not suddenly change flow direction, not to as excessively reduce the absolute sectional size of flow (layer) as possible without smoothly and slowly funneling fluids immediately before the hole of discharge ports, and to reduce residence time.

Fluids should preferably be decreased to less than 1/15 in sectional size, not excessively.

A total of four components are necessary when another component is desired to be used for surrounding the alternate high-molecule arrangement flow or added for making a "island in a sea" type composite fiber as shown in FIGS. 5, 6, 7 and 8. In many cases, so many components are not necessary for fibers, and the nozzle holders (packs), pumps, driving parts and circuits standing so many component are also not necessary, because this is uneconomical. When another component is desired to add to what is shown in FIG. 20(a), component B is preferable to be equal to component C in many cases.

FIG. 23 shows a preferable method for selecting the same component C as B among the components of the alternate high-molecule AB composite arrangement in FIG. 20(a). Namely when component B is included among the components of an alternate arrangement flow AB, it is preferable to provide resistors T and T' for passing two divisions thereof before they flow into an alternately fluid arranging element. The feed of the desired amounts of fluid B is possible using the controllable resistors 134 and 135 (control should be made using a screw or providing small pipes). Numeral 133 denotes first-fluid alternately-arranging elements and 136 second-fluid alternately-arranging elements. Component C is thus usable as third.

Good distribution is possible by providing resistor T at 137 and resistor T' at 138 in FIG. 20(b) for the two divisions of fluid B as shown in FIG. 24 and by providing resistor T at 142 and resistor T' at 141 in FIG. 20(b). Without them, no equal distribution can be continued for a long time. Numerals 139, 143 and 144 denote first-fluid alternately-arranging elements, and 140 and 145 second-fluid alternately-arranging elements. Component C is usable in the same manner as stated above.

It is clear from FIG. 18 that all the resistors in FIGS. 20-25 can be packed in the insert blocks.

Figure 26:
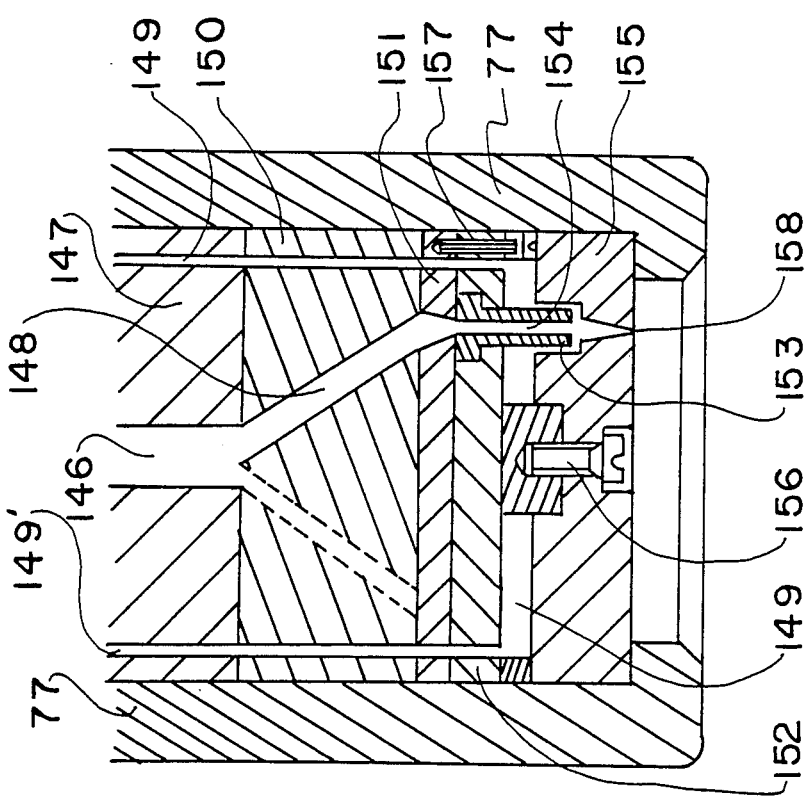
FIG. 26 partially shows a section of a discharger for the core-sheath type composite fibers whose core is an alternate high-molecule arrangement in accordance with the invention.

FIG. 26 shows a structure and a process for obtaining such a fiber as shown in FIG. 5 whose core is an alternate high-molecule AB arrangement and sheath is component C using the systems in FIGS. 23 and 18. The alternate high-molecule AB arrangement is introduced into 146. An alternately fluid arranging element is placed thereabove i.e. in the insert block 147. The distribution of the alternate high-molecule flow in 146 is made by lead holes 148. On the other hand the introduction of the high-molecule fluid C is made through the lead holes 149 in the same manner with distribution more changed. How to make this change would be easy to understand without description. They are provided on the insert block 150 with the lead holes.

The alternate high-molecule arrangement flow is introduced into the holes in the first upper nozzle plate 151. A holed projection 153 on the second nozzle plate 152 thereunder is directed downward when fitted. Provided therein hole 154 communicating with lead hole 148. The projection is kept under the upper plate 151 for preventing its coming out upward from 152. It is fitted into an impression in 155 maintaining a small clearance therewith. Discharge hole 158 is provided at the bottom of the impression.

High-molecule fluid C is introduced between the nozzle plates 152 and 154 from 149, passes through a small clearance discharged from 158 surrounding the high-molecule flow. The screws 156 and 157 and so forth are used to fasten the nozzle plates.

Needless to say the core-sheath configuration is provided in great quantities on the other parts of the nozzles also.

Figure 27:
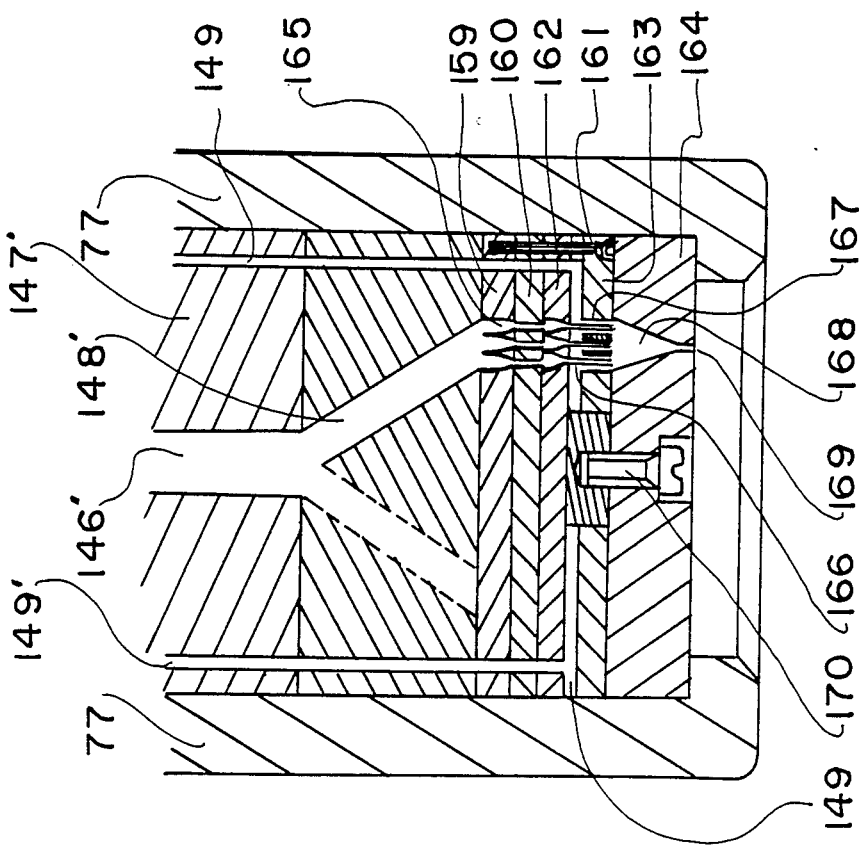
FIG. 27 partially shows a section of a discharger for the "island in a sea" composite fibers whose islands are an alternate high-molecule arrangement in accordance with the invention.

FIG. 27 shows a structure and process for making a "island in a sea" type composite fiber from alternate high-molecule arrangement. They are very similar to those in FIG. 26 except their nozzles. The alternate high-molecule arrangement flows to the upper nozzle plate 159 via 146' and 148'. Small holes 165 are provided therein. It flows to the discharge collecting nozzle 164 via the middle nozzles 160 and 162 and lower nozzle 163 and is discharged through the discharges hole 169. A pipe 166 is embedded in the middle nozzles and kept under 160 and 159 for preventing its escape. It is fitted into the hole in the nozzle plate 163 via the component C introducing space between the nozzle plates 162 and 163. The hole 167 in the nozzle plate 163 is somewhat larger than the pipe, forming a small annular space. Therefore, core-sheath flow is formed in the pipe, collected by the multi-funnel shaped collector 168, smoothly throttled and discharged through 169 as "island in a sea" flow. Needless to say first- and second-fluid alternately-arranging elements are provided at the upper course than 146' and a system and a structure in FIG. 23 are employed for the distribution of component B. The component C is introduced into 149. Numerals 170 and 161 are the bolts for clamping the nozzle plates to each other. They are provided at other parts of the nozzle plates. Three pipes are illustrated. However, 16 pipes are provided par unit (collector 168) to form 16 islands. The selectable quantities of islands include 3, 4, 5, 7, 8, 11, 12, 13, 15, 16, 24, 36, 60, 70, 145, 223, . . . Island rations (AB) can be raised above 50% or in some cases to about 90%. By using such a system, fiber bundles can be formed and fibers with even 100–1,000 microdeniers are easy to obtain.

How to make spinning would be sufficiently clear from the description made heretofore. Further it would be clear from FIGS. 18, 26 and 27 that the systems for four components ABCD and 4-component fibers are easy to manufacture.

As shown in FIG. 9 and as described above, the first-fluid alternately-arranging elements form a substantial angle of about 90° with the second-fluid alternately-arranging elements $((90°\pm 45°)\pm(\text{integer})\times 180°)$. Despite this an element twist-connecting pipes are usable. They will be described hereinafter.

Figure 28:
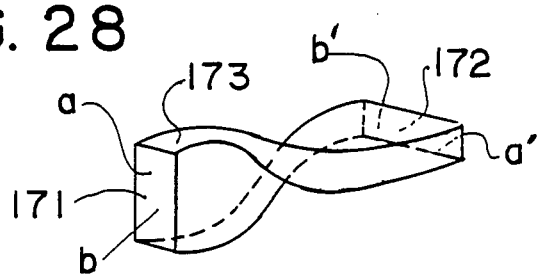
FIGS. 28, 29, 30 and 31 are the explanatory views of various systems for the about 90°-twisted feed of the fluids usable for obtaining an alternate high-molecule arrangement in accordance with the invention.

FIG. 28 shows a 90°-twisted rectangular pipe. Fluids are twisted by 90° after flowing into the inlet 171 and until flowing out at 172. The angle of this twist can be increased when fluids have a high viscosity. Fluids are twisted, their parts at 171(a) and (b) coming to 172(a') and (b') respectively.

Figure 29:
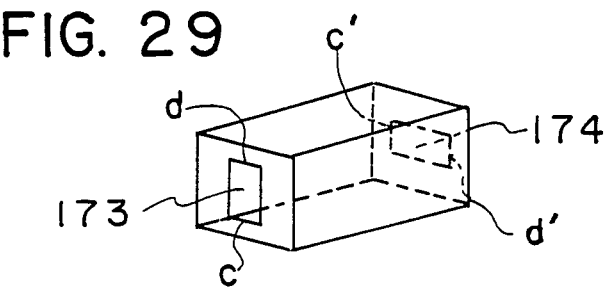

FIG. 29 shows a twisting element with a square outer shape. The holes 173–174 therein are the same as 171–172 in that twist is made. The parts at (c) and (d) of fluids therefore come to (c') and (d') respectively.

Figure 30:
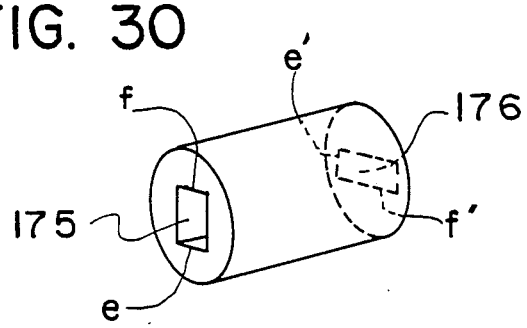

FIG. 30 shows a twisting element with a cylindrical outer shape. It has the same twist between 175 and 176 as that in FIG. 28. The parts at (e) and (f) of fluids come to (e') and (f') respectively.

Figure 31:
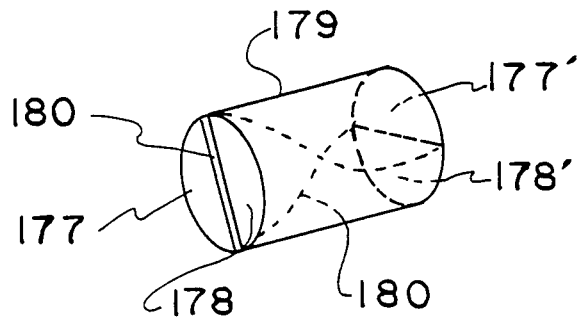

FIG. 31 shows a twisting element whose both inside and outside are cylindrical. A twisting plate 180 is inserted therein so that the parts at 177 and 178 of fluids come to 177' and 178' respectively. However, it is not preferable to use any twisting element if possible because it is more liable to disturb fluids than alternately fluid arranging elements.

Next, description will be given hereinafter about alternate fluid arrangement elements and their combination for carrying out this invention, without using the twisting element said above.

Figure 16:
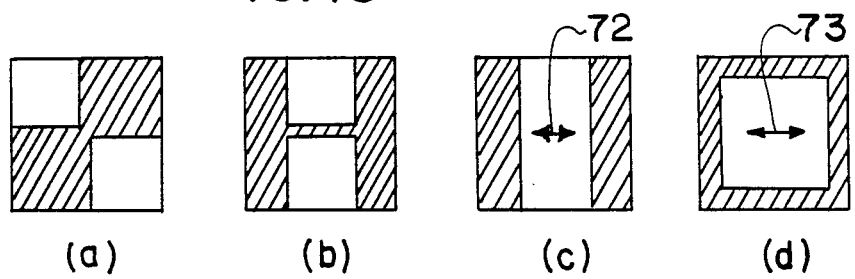
FIG. 16 are the sectional views of an alternately fluid arranging element in FIG. 15.
Figure 33:
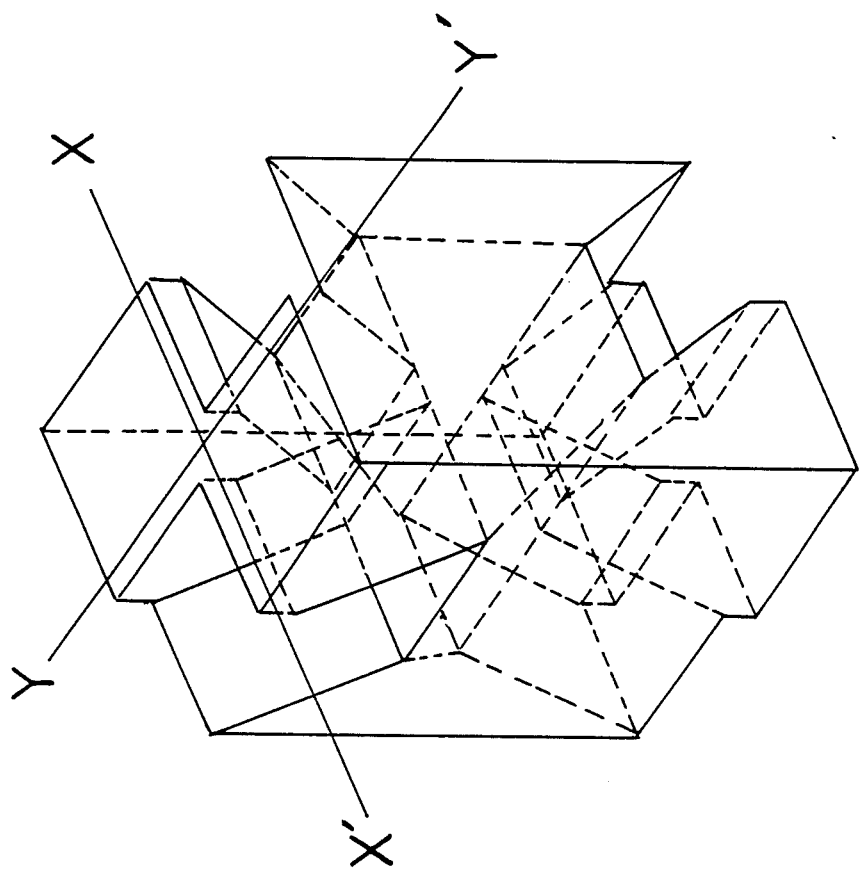
FIGS. 32 and 33 are the perspective views of the alternate fluid arangement elements in accordance with the invention (their outer circumference is omitted).
Figure 32:
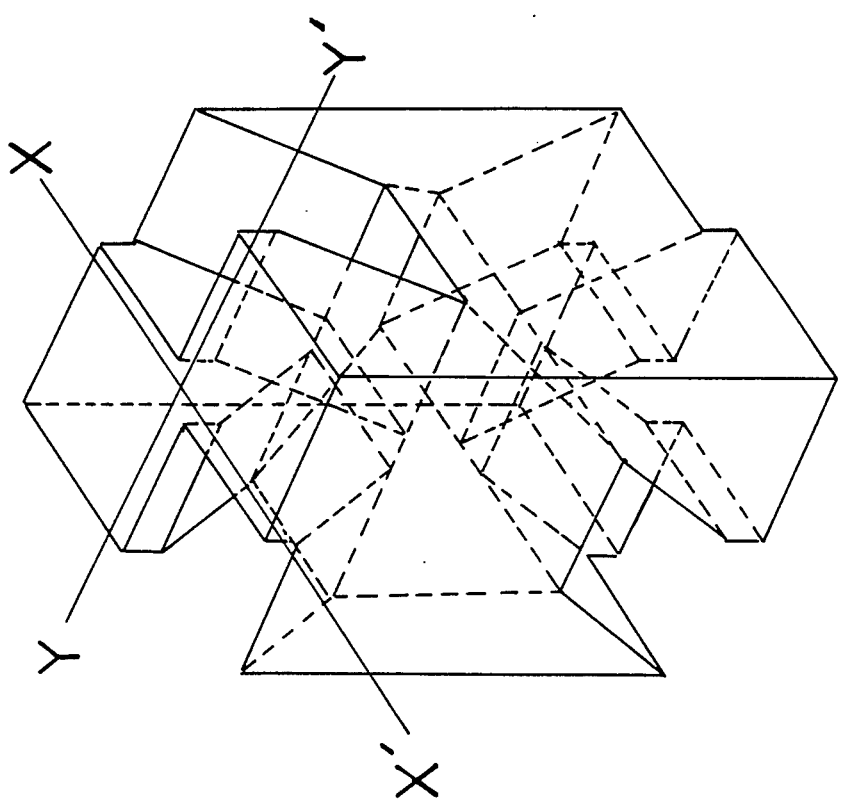

FIG. 32 is a perspective view of an alternate fluid arrangement element obtained by combining (a) and (b) shown in FIG. 17 while FIG. 33 is that of an alternate fluid arrangement element devised by the inventors. FIG. 34 shows a duct (fluid passage) extending between the inlet and outlet of the alternate fluid arrangement elements shown in FIG. 33 by illustrating the sections of its divisions. The relationship between FIGS. 33 and 35 corresponds to that between FIGS. 32 and 16. A major difference between FIGS. 16 and 34 is that the former or latter shows the fluid interfaces formed along the X- or Y-axis respectively of fluids.

The invention can be easily worked out by using the alternate fluid arrangement elements shown in FIG. 32 (FIG. 17) and FIG. 33 as the first and second, respectively, mentioned above. Namely when what is shown in FIG. 16(d) is obtained through the final division of the first alternate fluid arrangement elements, fluids are throttled and led to the part A shown in FIG. 34 while their third component is separately introduced into part B.

The invention cannot be carried out without using any twisting element however only such a conventionally-known alternate fluid arrangement element as shown in FIG. 32 may be connected. It however becomes contrary when combination is made with an alternate fluid arrangement shown in FIG. 33 as stated above.

Contrary to above description, the invention may be carried out by using such alternate fluid arrangement elements as shown in FIGS. 33 and 32 (FIG. 17) as the first and second respectively.

Next, description will proceed to the configurations of and combinations between alternate fluid arrangement elements that are suitable for uniformly-dividing and arranging fluids with the reduced influences of duct wall thereon.

Being susceptible of the influences of duct wall, the alternate fluid arrangement elements, particularly highly-viscous ones, cause arrangement disturbance and biased flow. Further such inconveniences occur that the degree of the decomposition of the polymers at the wall part of a duct is considerably differ from that at its central part because they stagnate for a long time at the former.

This will be described in conenction with FIG. 35.

In FIG. 35(a), a part P1 of a fluid is located closest to duct wall. It comes to the vicinity of P2, P3, P4 and P5 at (b), (c), (d) and (e) respectively, i.e. remains close to duct wall for a long time.

This is because the combination of fluid layers has a fixed regularity and because the duct for moving fluids upon their redividing combination after joining does not have any constant diameter.

The principles of the method and system for avoiding the defect stated above are shown in FIG. 36. FIG. 36(a) shows fluid A and B inflow parts. The part K1 at duct wall of a fluid should be noted. FIG. 36(b) is the same as FIG. 35(b) although it is a slightly-enlarged drawing of the flattened fluid obtained through joining. The part k1 transfers to k2. Next the invention uses the novel structure and method for returning the divided fluid after joining to the third and first quadrants, not to the fourth and second. Namely, as shown in FIG. 36(c), the part k2 comes to the part k3 in (c). Therefore the next alternate fluid arrangement element cannot be combined with the same. The methods and systems in accordance with the invention combine it with a new alternate fluid arrangement element. They have the following functions. The fluid divided as shown in FIG. 36(c) is transferred and flattened so that the part k3 is located close to the part k4 as shown in FIG. 36(d), a slightly-enlarged drawing. Thereafter it is divided in two and the combination fluid is relocated as shown in (e). The part k4 then transfers close to the part k5. They thus make a different mode of fluid joining from conventional ones. They can be used alternately with conventional ones. It is necessary to use them at least one time for achieving the purposes of the invention. The fluid parts close to duct wall are led to the center of flow so that fluids undergo more uniform alternate arrangement. A pair of categories of alternate fluid arrangement elements are convenient for alternate arrangement because this enables the fluids at the inlet and outlet parts to agree with each other. Their alternate fluid arrangement efficiency does not differ from that of conventional ones at all.

Figure 37:
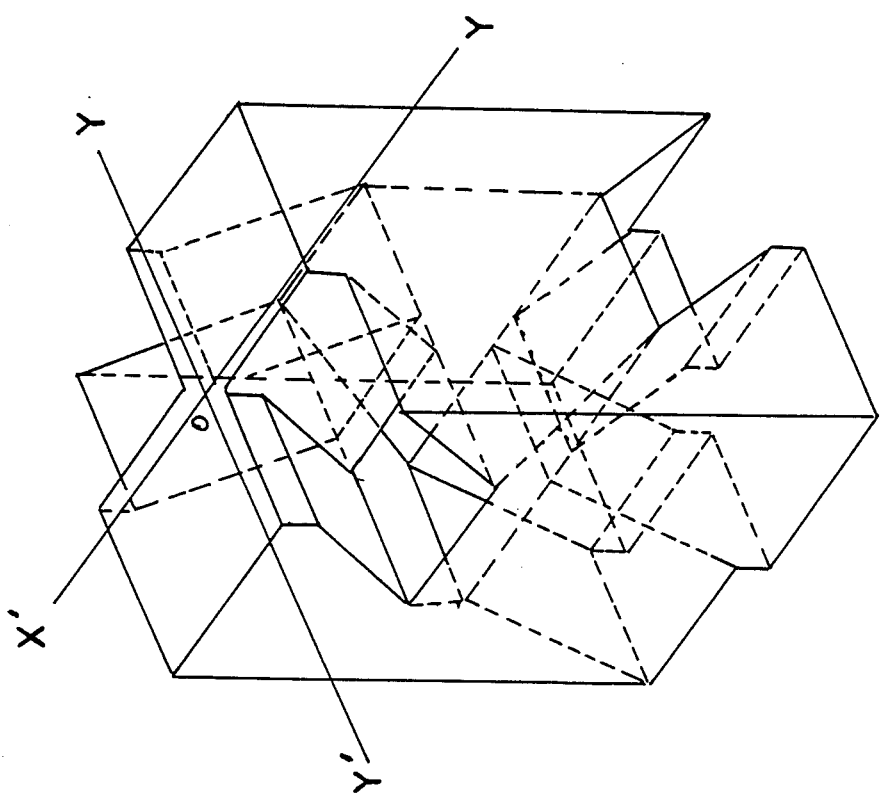

FIG. 37 shows a duct structure in accordance with the invention. Its inlet part is provided at the fourth and second quadrants of X- and Y-axes. Fluids are joined while set along Y-axis so that their central part comes into a plane, deformed, arranged along X-axis (the plane extending along X-axis and longitudinally), and cut into the two arranged along Y-axis; and their outlet parts are brought to the third and first quadrants.

Figure 38:
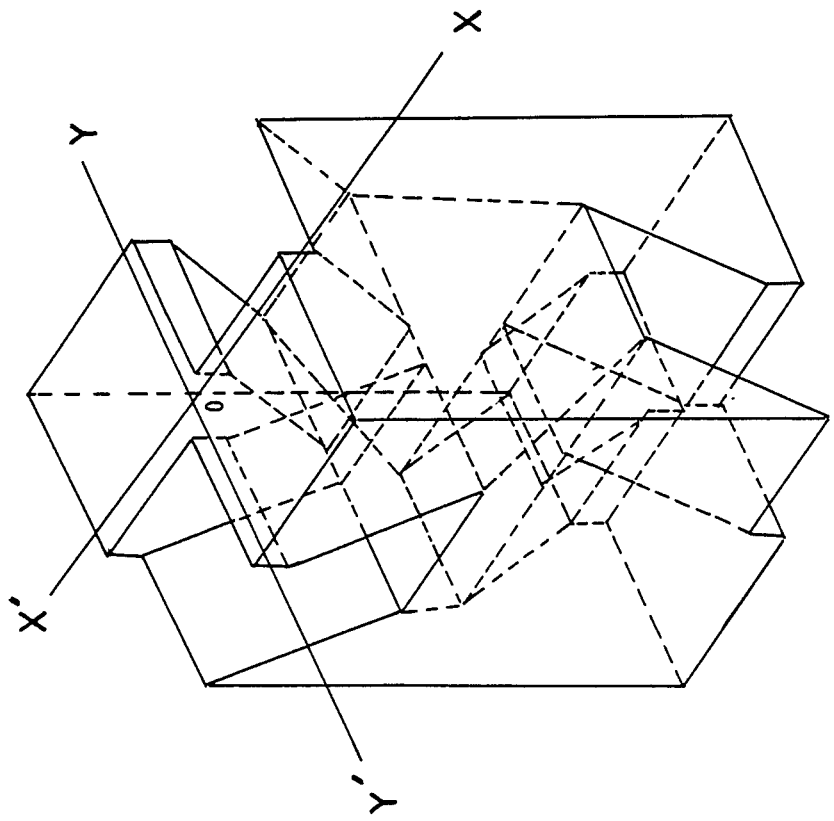
FIGS. 37 to 40 are the perspective views of the alternate fluid arrangement elements in accordance with the invention (their outer circumference is omitted).

FIG. 38 shows the inlet parts being located at the third and first quadrants of X- and Y-axes likewise. Fluids are joined while set along Y-axis so that their central part comes into a plane, deformed, arranged along X-axis (the plane extending along X-axis and longitudinally), and cut into the two arranged along Y-axis; and their outlet parts are brought to the fourth and second quadrants.

Figure 40:
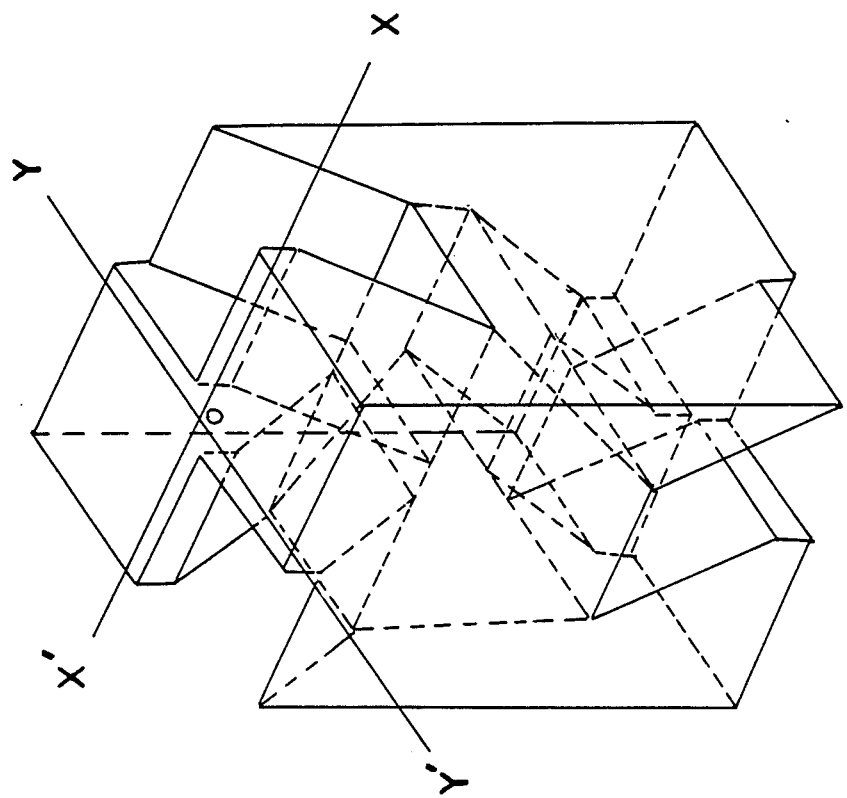
Figure 39:
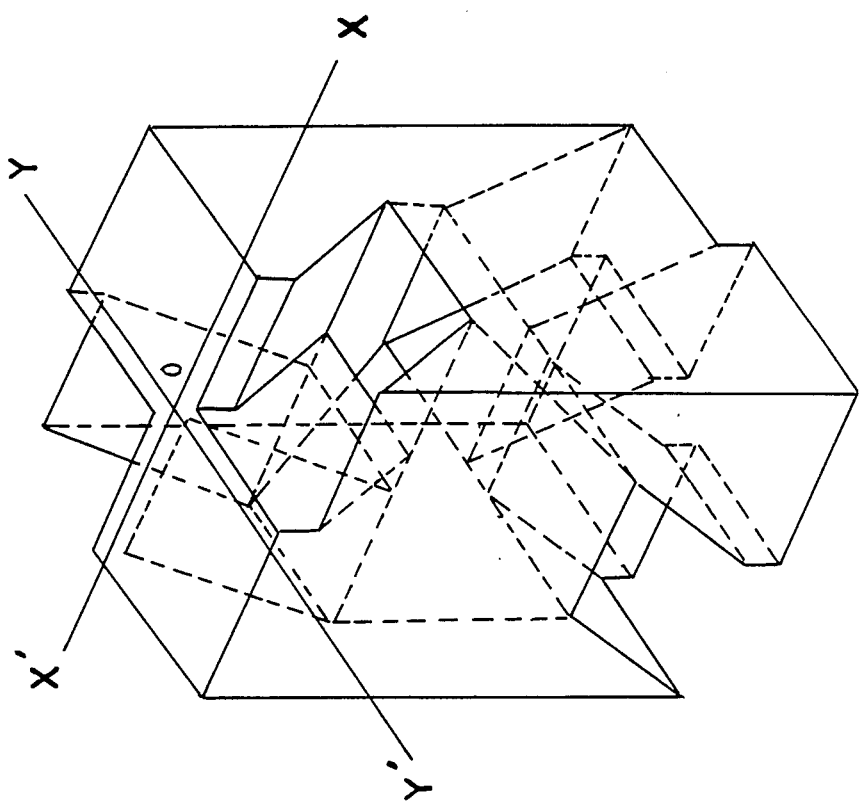

FIGS. 39 and 40 correspond to FIGS. 37 and 38 respectively. The arrangement direction in the former is however quite differs from that in the latter. This is similar to the relationship between FIGS. 32 and 33. The combination between FIGS. 39 and 40 can therefore be used in place of that between FIGS. 37 and 38. Further the use of the combination between the alternate fluid arrangement elements shown in FIGS. 37 and 38 as the first and that between those shown in FIGS. 39 and 40 as the second is advantageous because no twisting element is necessary. Of course the contrary use if allowed.

The fluids shown in FIGS. 37 and 38 can be paired as well as those shown in FIGS. 39 and 40. Much care is necessary in combining the fluids shown in FIGS. 37 and 40 or those shown in FIGS. 39 and 38, provided the same outer configuration is employed, because the initial state is recovered after forming their layer flow. In the invention this is named the correlation between racemic modifications. For preventing it, it is preferable to provide guide or knock-pin holes in the plates or columnar materials constituting such a duct, not to make their exterior symmetrical or provide marks.

The structures in accordance with the invention have been described heretofore mainly in connection with those of ducts. Any is of course selectable as their shape out of triangles, squares, pentagons, hexagone, . . . , circular plates, columns and so forth. Further any of 1, 2, 3, 4, . . . N pieces of such ducts can be provided for high efficiency. Their arrangement can be shaped into petal, matrix, zigzag, checkerwise, multiconcentric and all other forms. Further multiple combination is possible between the pair of alternately-arranged fluids.

Excessively-sudden joining or rearrangement is not preferable for such alternate fluid arrangement elements. Flow passages or ducts should preferably be at less than 45° with the flow or combination direction of alternate fluid arrangement elements (that generally agrees with their central line).

Preferable high molecules include A/B and A/B/C (B=C in some cases).

Examples of the components

If PET=polyethyleneterephthalate or its denaturation (incl. various known copolymers), N=nylon (66, 6, etc.), PE=polyethylene, PST=polystyrene, PBT-polybutyleneterephthalate, and PEG=polyethyleneglycol, the following are obtained:
a. PET/5-sodiumsulfoisophthalate copolymer PET
b. N/5 sodiumsulfoisophthalate copolymer PET
c. PET/PST
d. PET/2-ethylhexylacrylate copolymer PST N/2-ethylhexylacrylate copolymer PST
f. PET/PE
g. N/PE
h. PBT/polyalkyleneglycol copolymer elastic PBT
i. PET/PEG mixed PST
j. N/PEG Mixed PST
k. PET/N/5-sodiumsulfoisophthalate copolymer PET (3 components)
l. PST/polymethylmethacrylate
m. Polymethylmethacrylate or polymethylmethacrylate deutride/-high light transmittance fluorine containing polymers (polyvinylidene fluoride)

All the purposes of the invention are thus achieved. The fibers and films in accordance with the invention enjoy a wide scope of useful application to industrial and other various uses.

The fibers in accordance with the invention are described in details heretofore. The embodiments of the invention will be mentioned hereinafter. However its effectiveness is not limited thereby. It has possibilities of development and applicability.

Embodiment 1

Polyethyleneterephthalate as island component A and polystyrene as sea components B and C were spinned at 285° C. using a 3-component spinning machine with a number of the alternately fluid arranging elements in FIGS. 15 and 16 arranged as shown in FIG. 18. Therein the quantities of first- and second-fluid alternately-arranging elements were fixed at 16 and 8, and the angle between the fluids AB and C at about 90°. An ordinary type nozzle of which the six discharge holes and the funnel-shaped device directly above it were increased 15 times in sectional size and larger sectional size respectively was used for spinning. Therein the quantity of the distributed island of A of AB per hole was:

$$(2^8) \times (2^8)/6 = \text{about } 1,092$$

so that an alternately high-molecule arranged fiber with about 1,000 islands was obtained.

The 2.8 steam-elongation fiber had 60 parts of component A, 20 parts of the component B and 20 parts of the component C (=B) and was about 3 deniers. The ultrathin residue of the alternately high-molecule arranged fiber obtained by removing polystyrene using trichloroethylene was calculated to be:

$$3 \times (60/100) \times (1/1,092) = \text{mean about } 0.0015 \text{ deniers.}$$

The actual fineness of the fibers above was between 0.0001 and 0.01 deniers.

Embodiment 2

A total of 85 parts of an alternate high-molecule arrangement were made using 55 parts of polyethyleneterephthalate as island component A, 15 parts as component B and 15 parts as component B' in the same manner as Embodiment 1. They and 15 parts of component C (sea) were spinned at 285° C. using a 3-component composite spinning machine with the numbers of first- and second-fluid alternately-arranging elements fixed at 18 and 9 respectively (total 27) and the number of the discharge nozzle holes for the "island in a sea" fiber with 16 islands fixed at 18. Spinning was carried out in good condition. The alternate high-molecule arrangement obtained was 2.5 d deniers after elongation. When examined using an electron microscope, component A was well dispersed and very fine. The following calculation was carried out. The number of the distributions of A per fiber:

$(2^9) \times (2^9)/18 =$ about 14,563

The number of the distributions of A per island:

$(2^9) \times (2^9)/18/16 =$ about 910

Ultrathin fiber:

$2.5 \times (55/100) \times (1/14,563) =$ about $0.000094 = 94$ microdeniers (mean)

It was learned from the fiber made by removing polystyrene using trichloroeethylene had 16 bundles of 900 pieces of 94 microdenier ultrathin fiber.

The actual fineness of the fibers above was between 0.0001 and 0.01 deniers.

POSSIBILITIES OF INDUSTRIAL USE:

As described heretofore, the alternate high-molecular arrangements in accordance with the invention are useful among the fibers to be used for artificial leathers, waterproof high-density woven and knitted fabrics, raised fabrics, and so forth, as well as among the films for deflecting plates and sophisticated light-reflecting road signs.

I claim:

1. A multi-core composite fiber or film continuous production process comprising the steps of making a primary multi-layer structure of at least two immiscible fluids comprising a multiplicity of alternately arranged layers having interfaces extending substantially in a common direction, said common direction extending along the longitudinal flow direction of said primary multi-layer structure, separating portions of said layers along a direction extending at an angle to said running direction, and making a secondary multi-layer structure by interposing another polymer fluid layer between said separated portions, thereby cutting the interfaces of the polymers of the primary multi-layer structure into a number of parts by the insertion of said interposed fluid, thereby forming interfaces extending at an angle to said interfaces between said primary fluids and along said common direction, thereby forming at least one component of the primary multi-layer structure into a multiplicity of spaced-apart cores, and discharging the resulting multi-core structure.

2. A multi-core composite fiber or film production as claimed in claim 1, wherein the intersection angle of the interfaces of the primary multi-layer structure and said other polymers is $\pm(90\pm45)\pm(\text{integer})\times 180°$.

3. A multi-core composite fiber or film production process as claimed in claim 1 or 2, wherein the cross-sectional area ratio of the multi-core component of the multi-core composite fiber or film is above 50% thereof.

4. A multi-core composite fiber or film production process as claimed in claim 3, wherein the number of the layers of said primary multi-layer structure is above 1.5 times of the sum of the number of said primary multi-layer structure and said other polymer in said secondary multi-layer structure.

5. A multi-core composite fiber or film production process as claimed in claim 1, wherein said primary multi-layer structure is made by repeating a process consisting of cutting a fluid stream having at least two polymer fluids A and B across their interface to form at least two parts, reassembling the two parts without rotation thereof, and expanding and thinning the fluids A and B thereby increasing said interfaces between the fluids A and B in size.

6. A multi-core composite fiber or film production process as claimed in claim 1 wherein said primary multi-layer structure is made by repeating the steps of cutting a fluid stream having at least two polymer fluids A and B into at least two small parts, thus forming an interface increasing the interface between the fluids A and B in size and rejoining them without rotation thereof.

7. A multi-core composite fiber or film production process as claimed in claim 5 or 6, wherein said secondary multi-layer structure is made by repeating the steps of cutting a layer of primary multi-layer structure and the fluid C thus forming a plurality of interfaces rejoining them without rotation thereof, increasing the interface between said primary multi-layer structure and fluid C in size.

8. A multi-core composite fiber or film production process as claimed in claim 7, wherein the process is so made that the total sectional area of said divided fluid is substantially equal to that of the following rejoined fluid.

9. A multi-core composite fiber or film production process as claimed in claim 5 or 6, wherein said secondary multi-layer structure is made by repeating a process consisting of cutting an overlapped layer of the primary multi-layer structure and the fluid C, thus forming a plurality of interfaces, increasing the interfaces in size and rejoining them.

10. A multi-core composite fiber or film production process as claimed in claim 9, wherein the proces is so made that the total sectional area of said divided fluid is substantially equal to that of the following rejoined fluid.

11. A multi-core composite fiber or film production process as claimed in claims 5 or 6, wherein the process is so made that the total sectional area of said divided fluid is substantially equal to that of the following rejoined fluid.

12. A multi-core composite fiber or film production process as claimed in claim 11 wherein said fluid C is a multi-layer structure.

13. A multi-core composite fiber or film continuous production process as claimed in claim 1, further comprising the step of covering the secondary multi-layer structure with another fluid D to form a sheath-core structure, and discharging the combined structure through a nozzle.

14. A multi-core composite fiber or film production process as claimed in claim 1, wherein the interposed polymer fluid is the same as either of the components of said primary multi-layer structure.

* * * * *

UNITED STATES PATENT AND TRADEMARK OFFICE
CERTIFICATE OF CORRECTION

PATENT NO. : 4,686,074
DATED : August 11, 1987
INVENTOR(S) : Miyoshi Okamoto

It is certified that error appears in the above-identified patent and that said Letters Patent is hereby corrected as shown below:

Column 15, line 57, kindly delete "35" and insert --34--.

Signed and Sealed this

Third Day of July, 1990

*Attest:*

HARRY F. MANBECK, JR.

*Attesting Officer*   *Commissioner of Patents and Trademarks*